(12) United States Patent
Terrell, II et al.

(10) Patent No.: US 8,352,261 B2
(45) Date of Patent: Jan. 8, 2013

(54) USE OF INTERMEDIATE SPEECH TRANSCRIPTION RESULTS IN EDITING FINAL SPEECH TRANSCRIPTION RESULTS

(75) Inventors: James Richard Terrell, II, Charlotte, NC (US); Marc White, Charlotte, NC (US)

(73) Assignee: Canyon IP Holdings, LLC, Wilmington, DE (US)

( * ) Notice: Subject to any disclaimer, the term of this patent is extended or adjusted under 35 U.S.C. 154(b) by 949 days.

(21) Appl. No.: 12/400,723

(22) Filed: Mar. 9, 2009

(65) Prior Publication Data
US 2009/0228274 A1    Sep. 10, 2009

Related U.S. Application Data

(60) Provisional application No. 61/034,815, filed on Mar. 7, 2008, provisional application No. 61/038,046, filed on Mar. 19, 2008, provisional application No. 61/041,219, filed on Mar. 31, 2008.

(51) Int. Cl.
*G10L 15/26* (2006.01)
*G10L 15/08* (2006.01)
(52) U.S. Cl. .......................... 704/235; 704/252; 704/251
(58) Field of Classification Search .................. None
See application file for complete search history.

(56) References Cited

U.S. PATENT DOCUMENTS

| | | | |
|---|---|---|---|
| 5,675,507 A | 10/1997 | Bobo, II | |
| 5,974,413 A | 10/1999 | Beauregard et al. | |
| 6,173,259 B1 | 1/2001 | Bijl et al. | |
| 6,219,638 B1 | 4/2001 | Padmanabhan et al. | |
| 6,490,561 B1 | 12/2002 | Wilson et al. | |
| 6,532,446 B1 | 3/2003 | King | |
| 6,654,448 B1 | 11/2003 | Agraharam et al. | |
| 6,687,339 B2 | 2/2004 | Martin | |
| 6,687,689 B1 | 2/2004 | Fung et al. | |
| 6,775,360 B2 | 8/2004 | Davidson et al. | |
| 6,816,578 B1 | 11/2004 | Kredo et al. | |

(Continued)

FOREIGN PATENT DOCUMENTS

EP      1274222 A2     1/2003
(Continued)

OTHER PUBLICATIONS

Information Disclosure Statement (IDS) Letter Regarding Common Patent Application(s) Dated Jun. 4, 2010.

(Continued)

*Primary Examiner* — Talivaldis Ivars Smits
(74) *Attorney, Agent, or Firm* — Knobbe Martens Olson & Bear LLP

(57) ABSTRACT

A communication system includes at least one transmitting device and at least one receiving device, one or more network systems for connecting the transmitting device to the receiving device, and an automatic speech recognition ("ASR") system, including an ASR engine. A user speaks an utterance into the transmitting device, and the recorded speech audio is sent to the ASR engine. The ASR engine returns intermediate transcription results to the transmitting device, which displays the intermediate transcription results in real-time to the user. The intermediate transcription results are also correlated by utterance fragment to final transcription results and displayed to the user. The user may use the information thus presented to make decisions as to whether to edit the final transcription results or to speak the utterance again, thereby repeating the process. The intermediate transcription results may also be used by the user to edit the final transcription results.

21 Claims, 29 Drawing Sheets

| Time sequence | Recognition Results |
|---|---|
| 1 | ... ... ... ... ... ... ... ... ... |
| 2 | ... ... ... ... was ... ... ... ... |
| 3 | ... ... ... ... was uh ... ... ... |
| ⋮ | ⋮ |
| 9 | ... ... ... ear was uh ... real ... ... |
| 10 | ... ... ... ear was uh see real ... ... |
| 11 | ... ... ... ear was uh see real ... ... |
| ⋮ | ⋮ |
| 19 | bat man in here was uh see real ... ... |
| 20 | bat man in here was uh see real ... ... |
| 21 | bat man in here was a see real ... ... |
| ⋮ | ⋮ |
| 29 | bat man in here was a serial killer |
| 30 | bat man in here was a serial killer |
| 31 | bat man in here was a serial killer |
| ⋮ | ⋮ |
| 39 | that man engineer was a serial filler |
| 40 | that man engineer was a serial filler |
| 41 | that man engineer was a serial filler |
| ⋮ | ⋮ |
| 49 | that man engineer is a cereal filler |
| 50 | that man engineer is a cereal filler |

U.S. PATENT DOCUMENTS

| | | | |
|---|---|---|---|
| 6,820,055 B2 | 11/2004 | Saindon et al. | |
| 6,895,084 B1 | 5/2005 | Saylor et al. | |
| 7,200,555 B1 | 4/2007 | Ballard et al. | |
| 7,206,932 B1 | 4/2007 | Kirchhoff | |
| 7,225,224 B2 | 5/2007 | Nakamura | |
| 7,233,655 B2 | 6/2007 | Gailey et al. | |
| 7,236,580 B1 | 6/2007 | Sarkar et al. | |
| 7,254,384 B2 | 8/2007 | Gailey et al. | |
| 7,302,280 B2 | 11/2007 | Hinckley et al. | |
| 7,640,158 B2 * | 12/2009 | Detlef et al. | 704/235 |
| 7,729,912 B1 * | 6/2010 | Bacchiani et al. | 704/252 |
| 7,899,670 B1 * | 3/2011 | Young et al. | 704/235 |
| 7,899,671 B2 * | 3/2011 | Cooper et al. | 704/252 |
| 8,027,836 B2 * | 9/2011 | Baker et al. | 704/260 |
| 2003/0008661 A1 | 1/2003 | Joyce et al. | |
| 2003/0050778 A1 | 3/2003 | Nguyen et al. | |
| 2003/0126216 A1 | 7/2003 | Avila et al. | |
| 2004/0005877 A1 | 1/2004 | Vaananen | |
| 2004/0015547 A1 | 1/2004 | Griffin et al. | |
| 2005/0010641 A1 | 1/2005 | Staack | |
| 2005/0021344 A1 | 1/2005 | Davis et al. | |
| 2005/0080786 A1 | 4/2005 | Fish et al. | |
| 2005/0101355 A1 | 5/2005 | Hon et al. | |
| 2005/0197145 A1 | 9/2005 | Chae et al. | |
| 2005/0288926 A1 | 12/2005 | Benco et al. | |
| 2006/0052127 A1 | 3/2006 | Wolter | |
| 2007/0115845 A1 | 5/2007 | Hochwarth et al. | |
| 2007/0180718 A1 | 8/2007 | Fourquin et al. | |
| 2007/0239837 A1 | 10/2007 | Jablokov et al. | |
| 2008/0077406 A1 * | 3/2008 | Ganong, III | 704/251 |
| 2008/0195588 A1 | 8/2008 | Kim et al. | |
| 2008/0243500 A1 * | 10/2008 | Bisani et al. | 704/235 |
| 2008/0261564 A1 | 10/2008 | Logan | |
| 2008/0275864 A1 | 11/2008 | Kim et al. | |
| 2009/0055175 A1 | 2/2009 | Terrell, II et al. | |
| 2009/0076917 A1 | 3/2009 | Jablokov et al. | |
| 2009/0083032 A1 | 3/2009 | Jablokov et al. | |
| 2009/0124272 A1 | 5/2009 | White et al. | |
| 2009/0163187 A1 | 6/2009 | Terrell, II | |
| 2009/0182560 A1 | 7/2009 | White | |
| 2009/0240488 A1 | 9/2009 | White et al. | |
| 2009/0248415 A1 | 10/2009 | Jablokov et al. | |
| 2009/0276215 A1 | 11/2009 | Hager | |
| 2010/0049525 A1 | 2/2010 | Paden | |
| 2010/0058200 A1 | 3/2010 | Jablokov et al. | |

FOREIGN PATENT DOCUMENTS

| | | |
|---|---|---|
| WO | 2006101528 A1 | 9/2006 |

OTHER PUBLICATIONS

Desilets, A., Bruijn, B., Martin, J., 2002, Extracting keyphrases from spoken audio documents, Springer-Verlag Berlin Heidelberg, 15 pages.

Information Disclosure Statement (IDS) Letter Regarding Common Patent Applications(s), dated Jul. 21, 2011.

David H. Kemsley, et al., A Survey of Neural Network Research and Fielded Applications, 1992, in International Journal of Neural Networks: Research and Applications, vol. 2, No. 2/3/4, pp. 123-133. Accessed on Oct. 25, 2007 at http://citeseer.ist.psu.edu/cache/papers/cs/25638/ftp:zSzzSzaxon.cs.byu.eduzSzpubzSzpaperszSzkemsley_92.pdf/kemsley92survey.pdf, 12 pages total.

Transl8it! translation engine, publicly available on http://www.transl8it.com since May 30, 2002. Retrieved on Oct. 26, 2007, 6 pages total.

vBulletin Community Forum, thread posted on Mar. 5, 2004. Page retrieved on Oct. 26, 2007 from http://www.vbulletin.com/forum/showthread.php?t=96976, 1 page total.

J2EE Application Overview, publicly available on http://www/orionserver.com/docs/j2eeoverview.html since Mar. 1, 2001. Retrieved on Oct. 26, 2007, 3 pages total.

Web-based Telephony Bridges for the Deaf, Glaser et al., 5 pages total.

SoftBridge: An Architecture for Building IP-based Bridges over the Digital Divide, Lewis et al., 5 pages total.

"International Search Report" and "Written Opinion of the International Search Authority" (Korean Intellectual Property Office) in Yap, Inc. International Patent Application Serial No. PCT/US2007/008621, dated Nov. 13, 2007, 13 pages total.

Fielding, et al., Hypertext Transfer Protocol—HTTP/1.1, RFC 2616, Network Working Group, sections 7, 9.5, 14.30, 12 pages total.

Marshall, James, HTTP Made Really Easy, Aug. 15, 1997, retrieved from http://www.jmarshall.com/easy/http/ on Jul. 25, 2008, 15 pages total.

Knudsen, Jonathan, Session Handling in MIDP, Jan. 2002, retrieved from http://developers.sun.com/mobility/midp/articles/sessions/ on Jul. 25, 2008, 7 pages total.

Information Disclosure Statement (IDS) Letter Regarding Common Patent Application(s), submitted by Applicant on Jul. 21, 2009.

* cited by examiner

| Time sequence | Recognition Results |
|---|---|
| 1 | … … … … … … … … |
| 2 | … … … … was … … … … |
| 3 | … … … … was uh … … … … |
| ⋮ | ⋮ |
| 9 | … … … ear was uh … real … … |
| 10 | … … … ear was uh see real … … |
| 11 | … … … ear was uh see real … … |
| ⋮ | ⋮ |
| 19 | bat man in here was uh see real … … |
| 20 | bat man in here was uh see real … … |
| 21 | bat man in here was a see real … … |
| ⋮ | ⋮ |
| 29 | bat man in here was a serial killer |
| 30 | bat man in here was a serial killer |
| 31 | bat man in here was a serial killer |
| ⋮ | ⋮ |
| 39 | that man engineer was a serial filler |
| 40 | that man engineer was a serial filler |
| 41 | that man engineer was a serial filler |
| ⋮ | ⋮ |
| 49 | that man engineer is a cereal filler |
| 50 | that man engineer is a cereal filler |

*FIG. 5*

```
POST /Yap/Login HTTP/1.1
Host: www.icynine.com:8080
User-Agent:   Motorola-V3m Obigo/Q04C1 MMP/2.0 Profile/MIDP-2.0
Accept: application/xhtml+xml,text/html;q=0.9,text/plain;q=0.8,image/png,*/*;q=0.5
Accept-Language: en-us,en;q=0.5
Accept-Encoding: gzip,deflate
Accept-Charset: ISO-8859-1,utf-8;q=0.7,*;q=0.7
Yap-Phone-Number: 15615551234
Yap-User-ID: 1143
Yap-Version: 1.0.3
Yap-Audio-Record: amr
Yap-Audio-Play: amr
Connection: close
```

FIG. 14

Login/Login HEADER

| Request Headers | Request Body | Response Body |
|---|---|---|
| User-Agent | N/A | YAP URL |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |

*FIG. 15*

Yap/Login HEADER

| Request Headers | Request Body | Response Body |
|---|---|---|
| User-Agent | N/A | YAP SessionId |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |

*FIG. 16*

SUBMIT HEADER

| Request Headers | Request Body | Response Body |
|---|---|---|
| User-Agent | Binary Audio Data | Submit Receipt |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |
| Yap-Filter-Set | | |
| Yap-ASR-Engine (opt) | | |
| Yap-Return-Cells | | |
| Yap-Return-TTS | | |
| Yap-Content-Type | | |
| Yap-Content-Length | | |

Binary Data Field

*FIG. 17*

RESULTS HEADER

| Request Headers | Request Body | Response Body |
|---|---|---|
| User-Agent | N/A | Results Object |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Password | | |
| Yap-Results-Receipt | | |
| Yap-Results-Timeout | | |

*FIG. 18*

Returns: an XML Hierarchy containing

- result—the body of result xml
- result-type
- result-code
- result-code-description
- result-text
- result-is-silence
- result-details
- result-conf
- lattice

*FIG. 19*

TTS HEADER

| Request Headers | Request Body | Response Body |
|---|---|---|
| User-Agent | N/A | TTS Binary Audio Data |
| Content-Language | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |
| Yap-TTS-String | | |
| Yap-TTS-Voice | | |

*FIG. 20*

CORRECT HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |
| Yap-Results-Receipt | | |
| Yap-Correction | | |

*FIG. 21*

PING HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |

FIG. 22

DEBUG HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |
| Yap-Debug-Msg | | |

FIG. 23

USE OF INTERMEDIATE SPEECH TRANSCRIPTION RESULTS IN EDITING FINAL SPEECH TRANSCRIPTION RESULTS

CROSS-REFERENCE TO RELATED APPLICATIONS

The present application is a nonprovisional patent application of, and claims priority under 35 U.S.C. §119(e) to, each of the following:
(1) U.S. provisional patent application Ser. No. 61/034,815, filed Mar. 7, 2008 and titled "USE OF INTERMEDIATE SPEECH TRANSCRIPTION RESULTS IN EDITING FINAL SPEECH TRANSCRIPTION RESULTS;"
(2) U.S. provisional patent application Ser. No. 61/038,046, filed Mar. 19, 2008 and titled "CORRECTIVE FEEDBACK LOOP FOR AUTOMATED SPEECH RECOGNITION;" and
(3) U.S. provisional patent application Ser. No. 61/041,219, filed Mar. 31, 2008 and titled "USE OF METADATA TO POST PROCESS SPEECH RECOGNITION OUTPUT."
Each of the foregoing patent applications from which priority is claimed is hereby incorporated herein by reference in its entirety.

Additionally, U.S. Patent Application Publication No. US 2007/0239837 is incorporated herein by reference, and each of the following patent applications, and any corresponding patent application publications thereof, are incorporated herein by reference:
(1) U.S. nonprovisional patent application Ser. No. 12/197,213, filed Aug. 22, 2008 and titled "CONTINUOUS SPEECH TRANSCRIPTION PERFORMANCE INDICATION;"
(2) U.S. nonprovisional patent application Ser. No. 12/197,227, filed Aug. 22, 2008 and titled "TRANSCRIBING AND MATCHING MOBILE DEVICE UTTERANCES TO KEYWORDS TAKEN FROM MOBILE DEVICE MESSAGES AND ASSOCIATED WITH WEB ADDRESSES;"
(3) U.S. provisional patent application 61/091,330, filed Aug. 22, 2008 and titled "METHODS, APPARATUSES, AND SYSTEMS FOR PROVIDING TIMELY USER CUES PERTAINING TO SPEECH RECOGNITION;"
(4) U.S. nonprovisional patent application Ser. No. 12/198,112, filed Aug. 25, 2008 and titled "FILTERING TRANSCRIPTIONS OF UTTERANCES;"
(5) U.S. nonprovisional patent application Ser. No. 12/198,116, filed Aug. 25, 2008 and titled "FACILITATING PRESENTATION BY MOBILE DEVICE OF ADDITIONAL CONTENT FOR A WORD OR PHRASE UPON UTTERANCE THEREOF;"
(6) U.S. nonprovisional patent application Ser. No. 12/212,644, filed Sep. 17, 2008 and titled "METHODS AND SYSTEMS FOR DYNAMICALLY UPDATING WEB SERVICE PROFILE INFORMATION BY PARSING TRANSCRIBED MESSAGE STRINGS;"
(7) U.S. nonprovisional patent application Ser. No. 12/212,645, filed Sep. 17, 2008 and titled "FACILITATING PRESENTATION OF ADS RELATING TO WORDS OF A MESSAGE;" and
(8) U.S. nonprovisional patent application Ser. No. 12/344,313, filed Dec. 26, 2008 and titled "VALIDATION OF MOBILE ADVERTISING FROM DERIVED INFORMATION."
(9) U.S. nonprovisional patent application Ser. No. 12/355,319, filed Jan. 16, 2009 and titled "USING A PHYSICAL PHENOMENON DETECTOR TO CONTROL OPERATION OF A SPEECH RECOGNITION ENGINE."

Finally, the disclosure of provisional application 60/789,837 is contained in Appendix A attached hereto and, likewise, is incorporated herein in its entirety by reference and is intended to provide background and technical information with regard to the systems and environments of the inventions of the current provisional patent application. Similarly, the disclosure of the brochure of Appendix B is incorporated herein in its entirety by reference.

COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE PRESENT INVENTION

Automatic Speech Recognition (ASR) systems convert spoken audio into text. Recognition accuracy for a particular utterance can vary based on many factors including the audio fidelity of the recorded speech, correctness of the speaker's pronunciation, and the like. These factors contribute to continuously varying levels of recognition accuracy which can result in several possible transcriptions for a particular utterance.

Some ASR systems are able to indicate transcription performance confidence in the transcription. In addition, some ASR systems are able to return multiple transcription options for a particular utterance, or fragment of an utterance, each with its own performance confidence. Some approaches for accomplishing this are described in U.S. Provisional Patent Application Nos. 60/957,386, 60/957,701 and 61/021,341.

Generally, an application that is displaying speech results might only display the results with the highest confidence values. However, in some cases, it may be useful to also make the other transcription options available to the user so that they can easily correct transcription errors by choosing from amongst all of the transcription options. If the display device has enough space, all of the results can be listed for the user, so that they can evaluate and choose the correct or most correct result. However, if the display device is small, there may only be room to display the highest confidence results, and the user may have to navigate through a user interface to see and select other result options. If this is the case, the user experience can become quite tedious, especially if there are numerous recognition options available for different parts of the utterance.

This disclosure describes an approach whereby multiple transcription result options can be exposed to the user at once, even on a small display device, by use of visual animation techniques.

SUMMARY OF THE INVENTION

The present invention includes many aspects and features. Moreover, while many aspects and features relate to, and are described in, the context of providing intermediate speech transcription results to a user for use in reviewing a transcribed utterance, the present invention is not limited to use only in providing intermediate speech transcription results to a user for use in reviewing a transcribed utterance, as will become apparent from the following summaries and detailed descriptions of aspects, features, and one or more embodiments of the present invention.

Accordingly, one aspect of the present invention relates to a method of providing intermediate speech transcription results to a user for use in reviewing a transcribed utterance. An exemplary such method includes receiving, at a user device, data representing text transcribed from an audio stream, representative of an utterance, by an ASR engine, the text including final speech transcription results and intermediate speech transcription results; at least temporarily, displaying, via the user device, the intermediate speech transcription results; and displaying, via the user device, the final speech transcription results.

In a feature of this aspect of the invention, the method includes the step of associating fragments of the intermediate speech transcription results with fragments of the final speech transcription results. Alternatively, the step of at least temporarily displaying the intermediate speech transcription results includes displaying all intermediate speech transcription results as they are received by the user device so that they may be viewed by a user. Furthermore, the step of displaying all intermediate speech transcription results as they are received by the user device includes displaying only then-current intermediate speech transcription results. Alternatively, the step of displaying all intermediate speech transcription results as they are received by the user device includes maintaining a list of intermediate speech transcription results and adding each newly-received intermediate speech transcription result to the list.

In a further feature of this aspect, the step of at least temporarily displaying the intermediate speech transcription results includes displaying intermediate speech transcription results at the same time as the step of displaying final speech transcription results. Furthermore, the step of displaying the intermediate speech transcription results includes displaying fragments of the intermediate speech transcription results in association with corresponding fragments of the final speech transcription results. Yet further still, the step of displaying the intermediate speech transcription results includes displaying one or more intermediate speech transcription results associated with a fragment in the final speech transcription results. Alternatively, the step of displaying the intermediate speech transcription results includes displaying one or more intermediate speech transcription results only for a particular fragment in the final speech transcription results. Further features include the step of receiving input, from the user, representative of the particular fragment in the final speech transcription results for which associated intermediate speech transcription results are to be displayed. Alternatively, a feature includes the step of displaying the intermediate speech transcription results includes displaying the one or more intermediate speech transcription results, associated with a fragment in the final speech transcription results, via a drop-down list. A further feature includes the step of displaying the intermediate speech transcription results includes displaying the one or more intermediate speech transcription results, via a drop-down list, ordered according to a confidence level received from the ASR engine in association with the respective intermediate speech transcription results. Alternatively, the step of displaying the intermediate speech transcription results includes displaying one or more intermediate speech transcription results for each fragment in the final speech transcription results.

In still a further feature of this aspect of the present invention, the method includes a step of making available, for editing by a user, the final speech transcription results in view of the intermediate speech transcription results. In an alternative feature, the methods includes receiving, from the ASR engine, a confidence level associated with each fragment of the intermediate speech transcription results. Yet a further feature the intermediate speech transcription results are displayed in an order according to the respective confidence levels associated therewith. Yet another alternative feature includes, prior to receiving data representing text transcribed from the audio stream by the ASR engine, a step of transmitting the audio stream from the user device to the ASR engine. In a further feature, the user device is a handheld device. In yet a further feature, the handheld device is a cell phone. In an alternative feature, the handheld device is a smart phone. In yet another feature the handheld device is a PDA.

In another feature of this aspect of the invention, the method includes the further step of receiving input from a user representative of editing instructions to be applied to the final speech transcription results. A further feature includes a step of transmitting, from the user device, the edited final speech transcription results in the form of a text message. In yet a further feature, the method includes a step of transmitting, from the user device, the edited final speech transcription in the form of an instant message.

Another aspect of the invention relates to a method of utilizing intermediate speech transcription results in reviewing a transcribed utterance for subsequent transmission as a text-based message. An exemplary such method includes receiving, at a handheld device, a spoken utterance from a user; transmitting the utterance to an ASR system, including a server, for transcription by an ASR engine in the system; receiving, at the handheld device, data representing text transcribed by the ASR engine, the text includes final speech transcription results and intermediate speech transcription results; temporarily displaying, via the handheld device, the intermediate speech transcription results, as they are received by the handheld device, so that they may be viewed by the user; after all speech transcription results are received by the handheld device, displaying, via the handheld device, the final speech transcription results; receiving input from the user representative of editing instructions to be applied to the final speech transcription results; and transmitting, from the handheld device, the edited final speech transcription results in the form of a text message or instant message.

Yet another aspect of the present invention relates to a method of utilizing intermediate speech transcription results in reviewing a transcribed utterance for subsequent transmission as a text-based message. An exemplary such method includes receiving, at a handheld device, a spoken utterance from a user; transmitting the utterance to an ASR system, including a server, for transcription by an ASR engine in the system; receiving, at the handheld device, data representing text transcribed by the ASR engine, the text including final speech transcription results and intermediate speech transcription results; after all speech transcription results are received by the handheld device, displaying, via the handheld device, the final speech transcription results; at least temporarily displaying, via the handheld device, fragments of the intermediate speech transcription results, in association with corresponding fragments of the final speech transcription results, so that they may be viewed by the user; receiving input from the user representative of editing instructions, using the fragments of the intermediate speech transcription results, to be applied to the final speech transcription results; and transmitting, from the handheld device, the edited final speech transcription results in the form of a text message or instant message In addition to the aforementioned aspects and features of the present invention, it should be noted that the present invention further encompasses the various possible combinations and subcombinations of such aspects and features.

BRIEF DESCRIPTION OF THE DRAWINGS

Further aspects, features, embodiments, and advantages of the present invention will become apparent from the following detailed description with reference to the drawings, wherein:

FIG. 5 is a table listing a sequence of transcription results as they form in real time during a speech recognition operation;

FIG. 14 is a typical header section of an HTTP request from the client in the commercial implementation;

FIG. 15 illustrates exemplary protocol details for a request for a location of a login server and a subsequent response;

FIG. 16 illustrates exemplary protocol details for a login request and a subsequent response;

FIG. 17 illustrates exemplary protocol details for a submit request and a subsequent response;

FIG. 18 illustrates exemplary protocol details for a results request and a subsequent response;

FIG. 19 illustrates exemplary protocol details for an XML hierarchy returned in response to a results request;

FIG. 20 illustrates exemplary protocol details for a text to speech request and a subsequent response;

FIG. 21 illustrates exemplary protocol details for a correct request;

FIG. 22 illustrates exemplary protocol details for a ping request; and

FIG. 23 illustrates exemplary protocol details for a debug request.

DETAILED DESCRIPTION OF THE PREFERRED EMBODIMENTS

Figure 1:
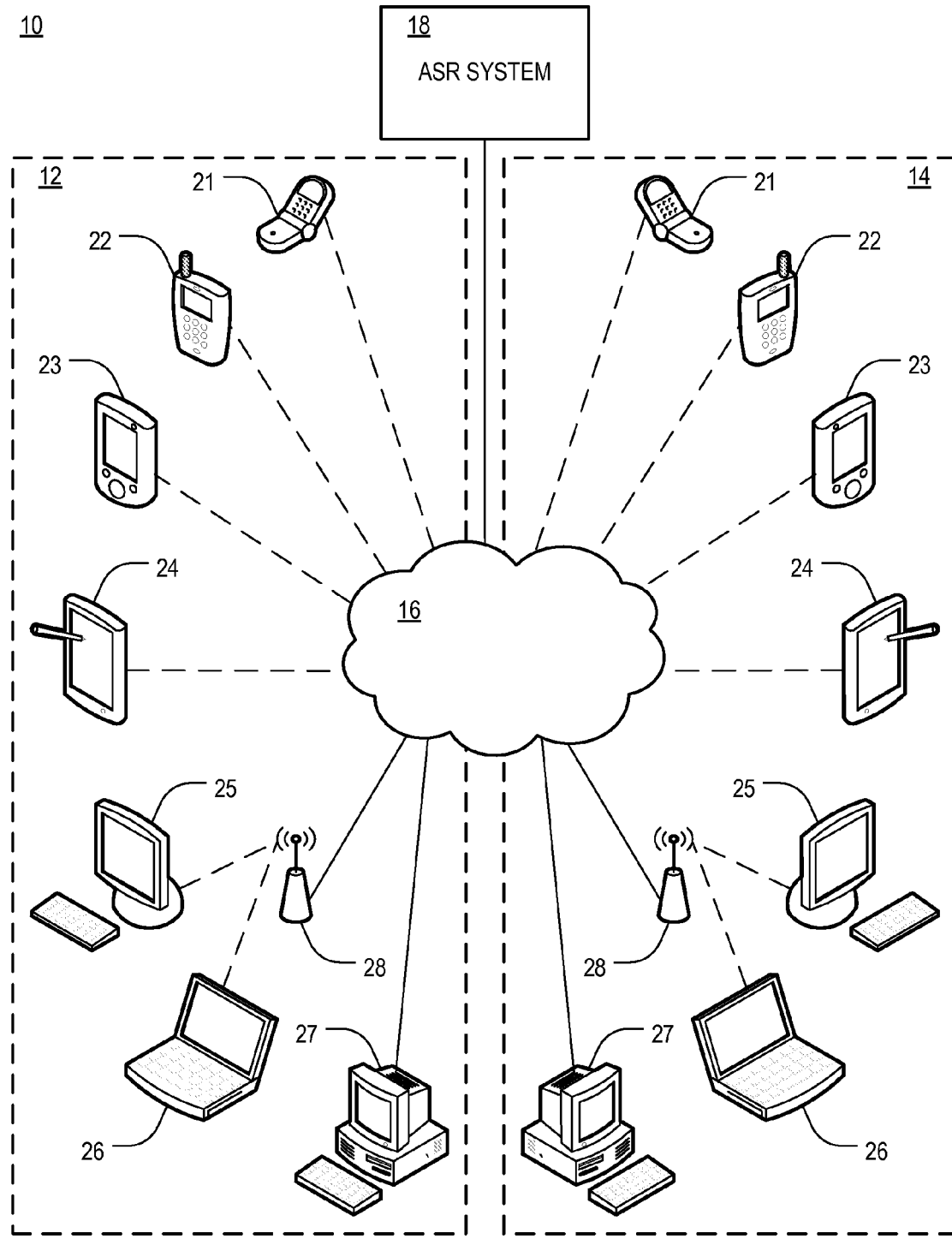
FIG. 1 is a block diagram of a communication system in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is it to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

FIG. 1 is a block diagram of a communication system 10 in accordance with a preferred embodiment of the present invention. As shown therein, the communication system 10 includes at least one transmitting device 12 and at least one receiving device 14, one or more network systems 16 for connecting the transmitting device 12 to the receiving device 14, and an automatic speech recognition ("ASR") system 18, including an ASR engine. Transmitting and receiving devices 12,14 may include cell phones 21, smart phones 22, PDAs 23, tablet notebooks 24, various desktop and laptop computers 25,26,27, and the like, one or more of which may be a handheld device. One or more of the devices 12,14, such as the illustrated iMac and laptop computers 25,26, may connect to the network systems 16 via a wireless access point 28. The various transmitting and receiving devices 12,14 (one or both types of which being sometimes referred to herein as "client devices") may be of any conventional design and manufacture.

Figure 2:
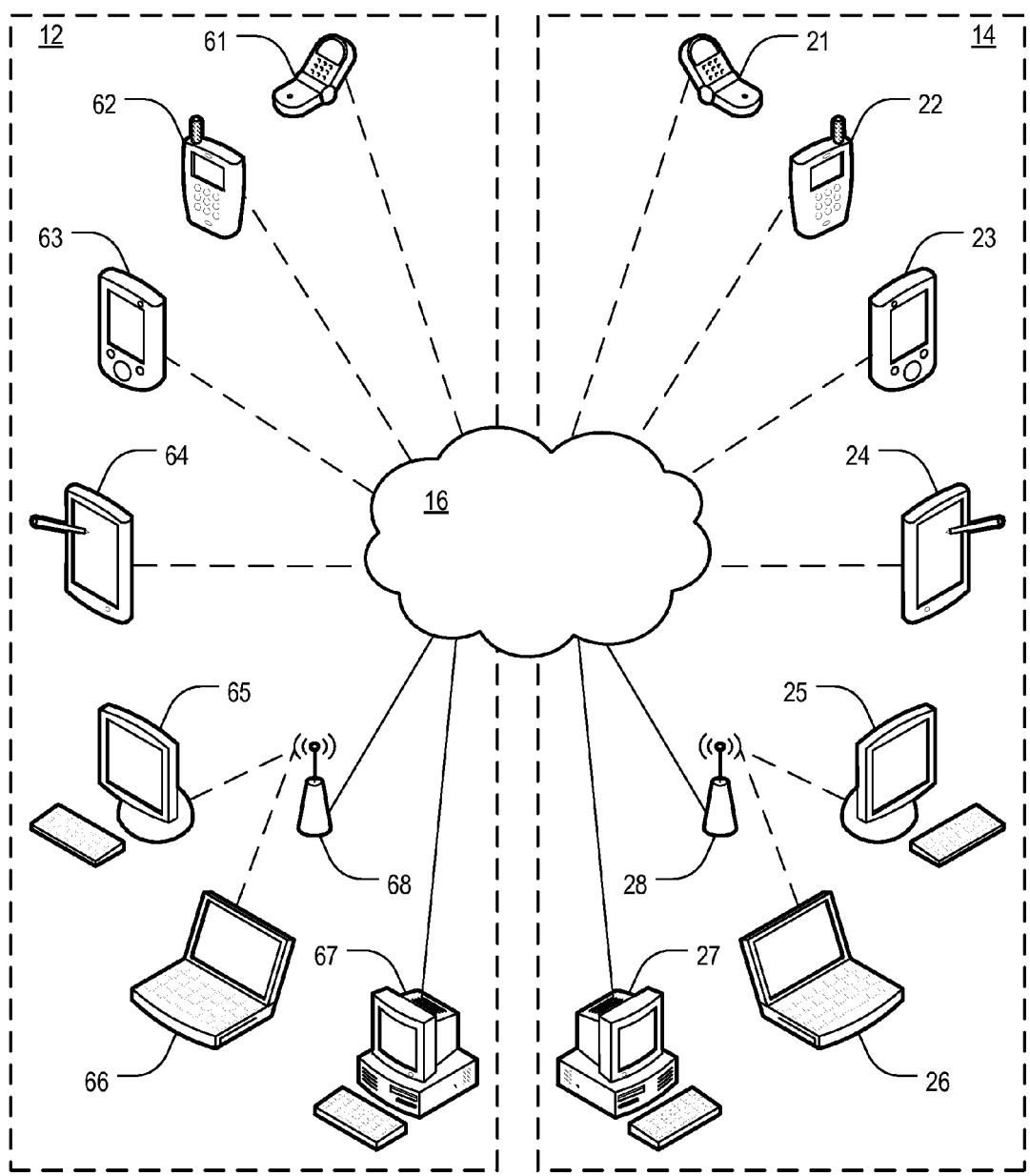
FIG. 2 is a block diagram of a communication system in accordance with another preferred embodiment of the present invention.

FIG. 2 is a block diagram of a communication system 60 in accordance with another preferred embodiment of the present invention. This system 60 is similar to the system 10 of FIG. 1, except that the ASR system 18 of FIG. 1 has been omitted and the ASR engine has instead been incorporated into the various transmitting devices 12, including cell phones 61, smart phones 62, PDAs 63, tablet notebooks 64, various desktop and laptop computers 65,66,67, and the like.

It will be appreciated that the illustrations of FIGS. 1 and 2 are intended primarily to provide context in which the inventive features of the present invention may be placed. A more complete explanation of one or more system architectures implementing such systems is provided elsewhere herein, in the incorporated applications and/or in the incorporated Appendices attached hereto. Furthermore, in the context of text messaging, the communication systems 10,60 each preferably include, inter alia, a telecommunications network. In the context of instant messaging, the communications systems 10,60 each preferably includes, inter alia, the Internet.

Figure 3:
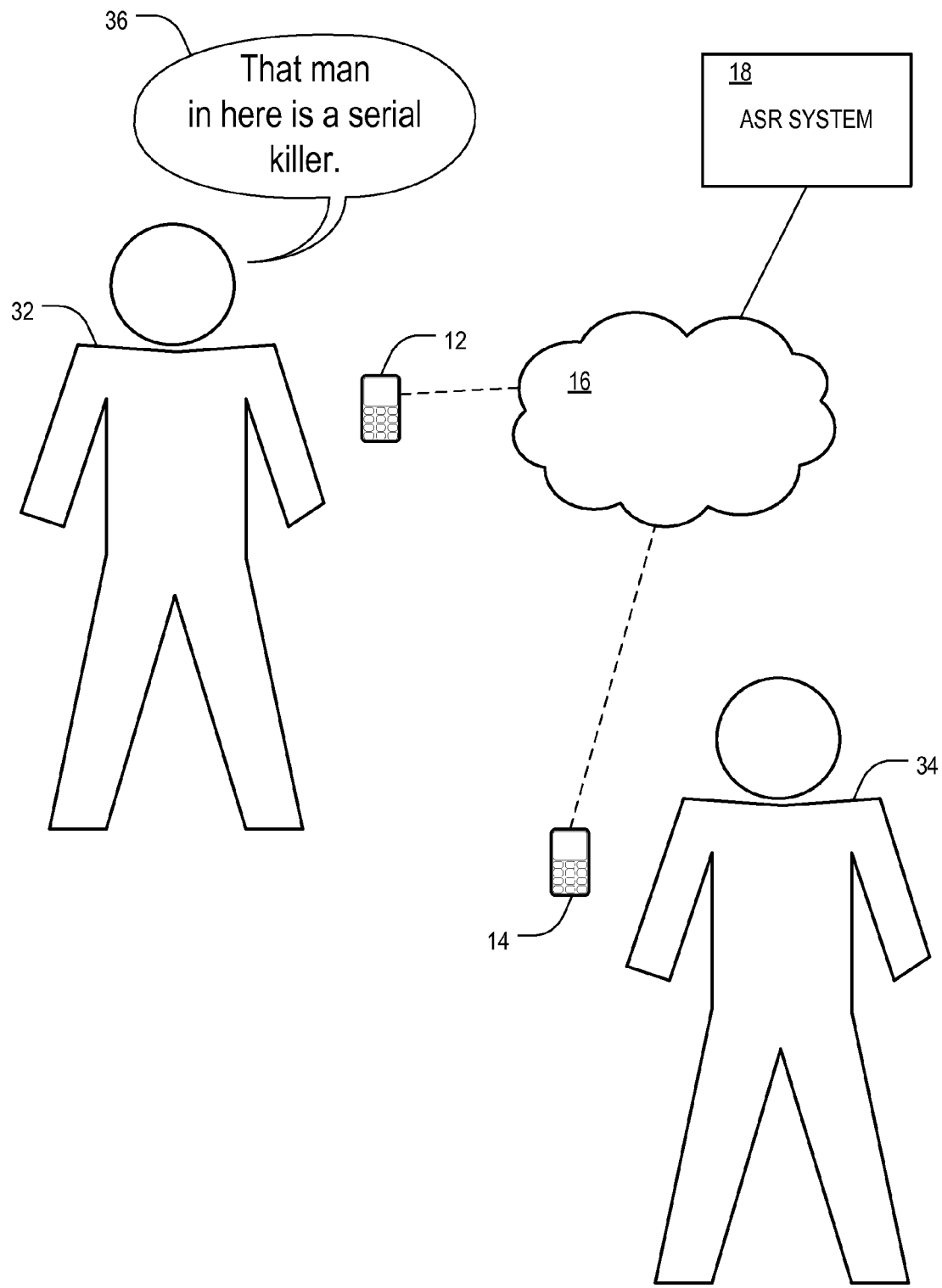
FIG. 3 is a block diagram illustrating communications between two users via a portion of the communication system of FIG. 1.

FIG. 3 is a block diagram illustrating communications between two users 32,34 via a portion of the communication system 10 of FIG. 1. As shown therein, a first user 32, sometimes referred to herein as a "transmitting user," is communicating with a second user 34, sometimes referred to herein as a "receiving user," by way of respective transmitting and receiving devices 12,14. More particularly, the transmitting user 32 uses his transmitting device 12 to initiate text messages that are transmitted to, and received by, the receiving user 34 via her receiving device 14. In the context of text messaging, the transmitting user 32 may send text messages, using his transmitting device 12, via SMS, and the receiving user 34 receives text messages, sent via SMS, on her receiving device 14. In the context of instant messaging, the transmitting user 32 may send instant messages, via an IM client, using his transmitting device 12, and the receiving user 34 receives instant messages, via an IM client, on her receiving device 14.

In either case, the first user 32 speaks an utterance 36 into the transmitting device 12, and the recorded speech audio is sent to the ASR system 18. In FIG. 3, the utterance 36 is "That man in here is a serial killer." The ASR engine in the ASR system 18 attempts to recognize and transcribe the speech into text.

In at least some embodiments, the transmitting user 32 in FIG. 3 may generate text messages by speaking into his transmitting device 12 and causing his utterances to be converted to text for communicating to the receiving device 14. One or more systems and methods for carrying out such a process are described, for example, in the aforementioned U.S. Patent Application Pub. No. US 2007/0239837, but are at least partially described herein. More particularly, FIG. 4 may be understood to be a block diagram of an exemplary implementation of the system 10 of FIG. 1. In this implementation, the transmitting device 12 is a mobile phone, the ASR system 18 is implemented in one or more backend servers 160, and the one or more network systems 16 include transceiver towers 130, one or more mobile communication service providers 140 (operating or joint or independent control) and the Internet 150. The backend server 160 is or may be placed in communication with the mobile phone 12 via the mobile communication service provider 140 and the Internet 150. The mobile phone has a microphone, a speaker and a display.

A first transceiver tower 130A is positioned between the mobile phone 12 (or the user 32 of the mobile phone 12) and the mobile communication service provider 140, for receiving an audio message (V1), a text message (T3) and/or a verified text message (V/T1) from one of the mobile phone 12 and the mobile communication service provider 140 and transmitting it (V2, T4, V/T2) to the other of the mobile phone 12 and the mobile communication service provider 140. A second transceiver tower 130B is positioned between the mobile communication service provider 140 and mobile devices 170, generally defined as receiving devices 14 equipped to communicate wirelessly via mobile communication service provider 140, for receiving a verified text message (V/T3) from the mobile communication service provider 140 and transmitting it (V5 and T5) to the mobile devices 170. In at least some embodiments, the mobile devices 170 are adapted for receiving a text message converted from an audio message created in the mobile phone 12. Additionally, in at least some embodiments, the mobile devices 170 are also capable of receiving an audio message from the mobile phone 12. The mobile devices 170 include, but are not limited to, a pager, a palm PC, a mobile phone, or the like.

The system 10 also includes software, as disclosed below in more detail, installed in the mobile phone 12 and the backend server 160 for causing the mobile phone 12 and/or the backend server 160 to perform the following functions. The first step is to initialize the mobile phone 12 to establish communication between the mobile phone 12 and the backend server 160, which includes initializing a desired application from the mobile phone 12 and logging into a user account in the backend server 160 from the mobile phone 12. Then, the user 32 presses and holds one of the buttons of the mobile phone 12 and speaks an utterance 36, thus generating an audio message, V1. At this stage, the audio message V1 is recorded in the mobile phone 12. By releasing the button, the recorded audio message V1 is sent to the backend server 160 through the mobile communication service provider 140.

Figure 4:
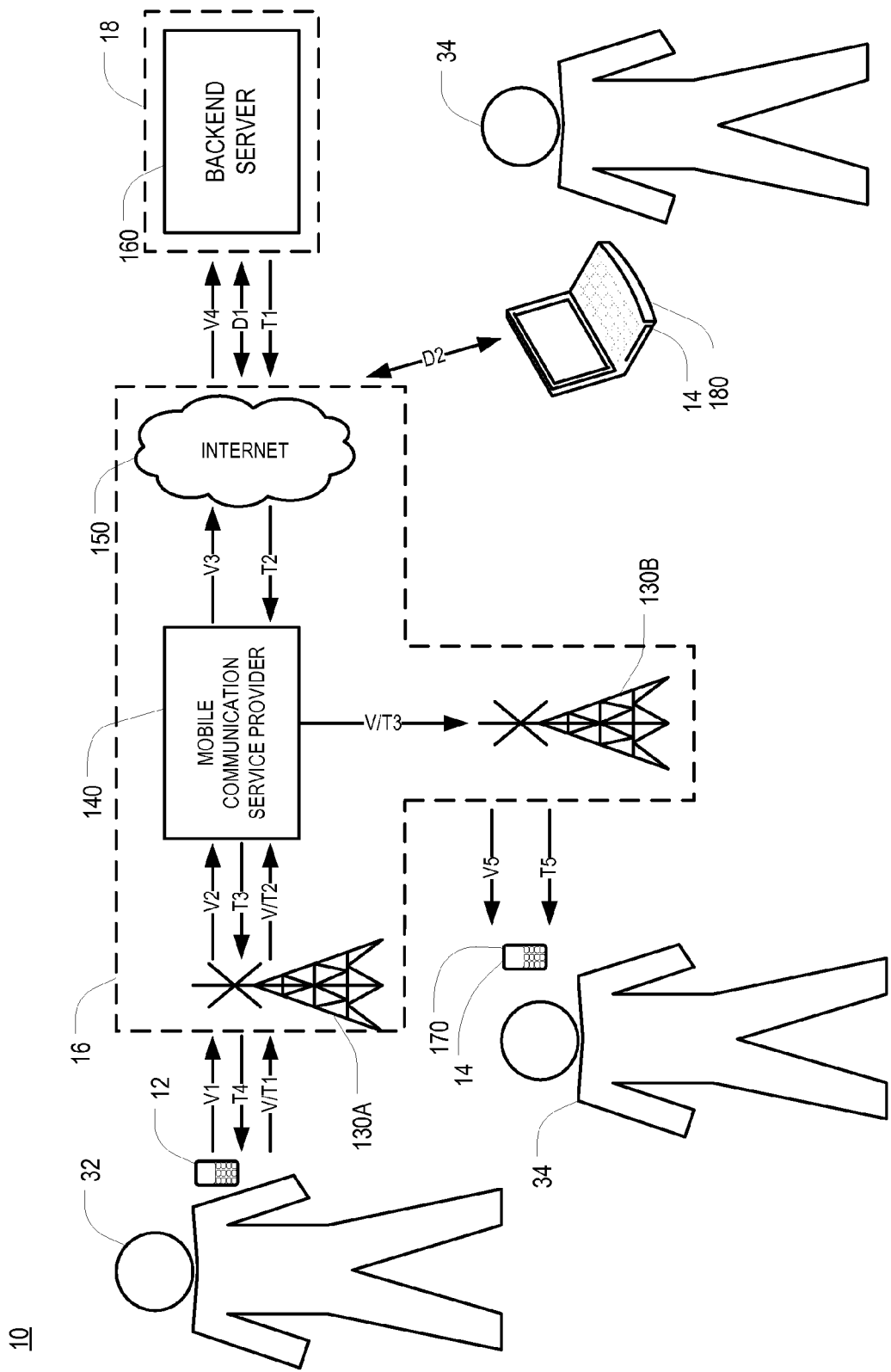
FIG. 4 is a block diagram of an exemplary implementation of the system of FIG. 1.
Figure 6A:
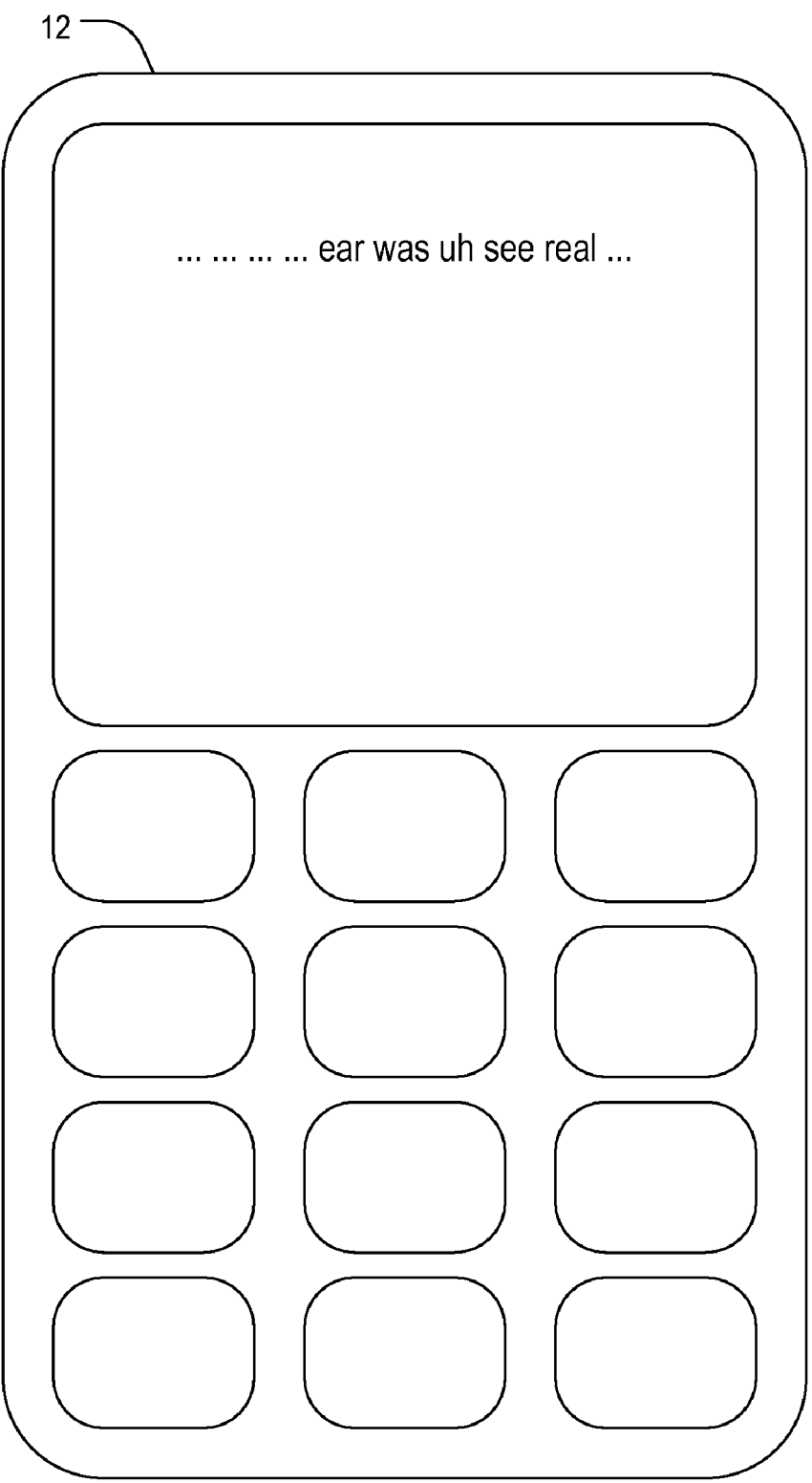
FIGS. 6A-6E are graphical depictions, on a transmitting device, of the transcription of the utterance of FIG. 3 at time sequence #10, #20, #30, #40 and #50, respectively.
Figure 6B:
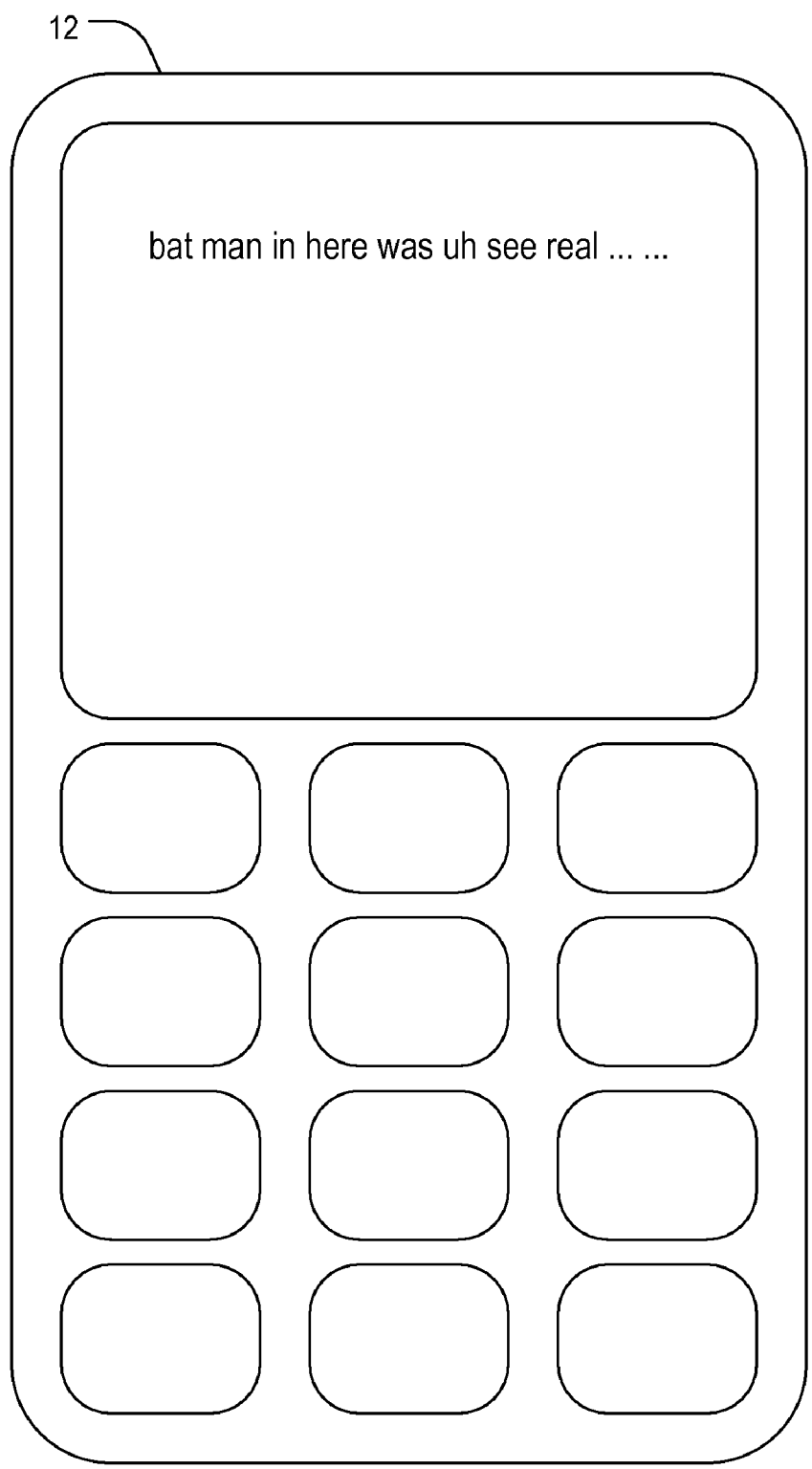
Figure 6C:
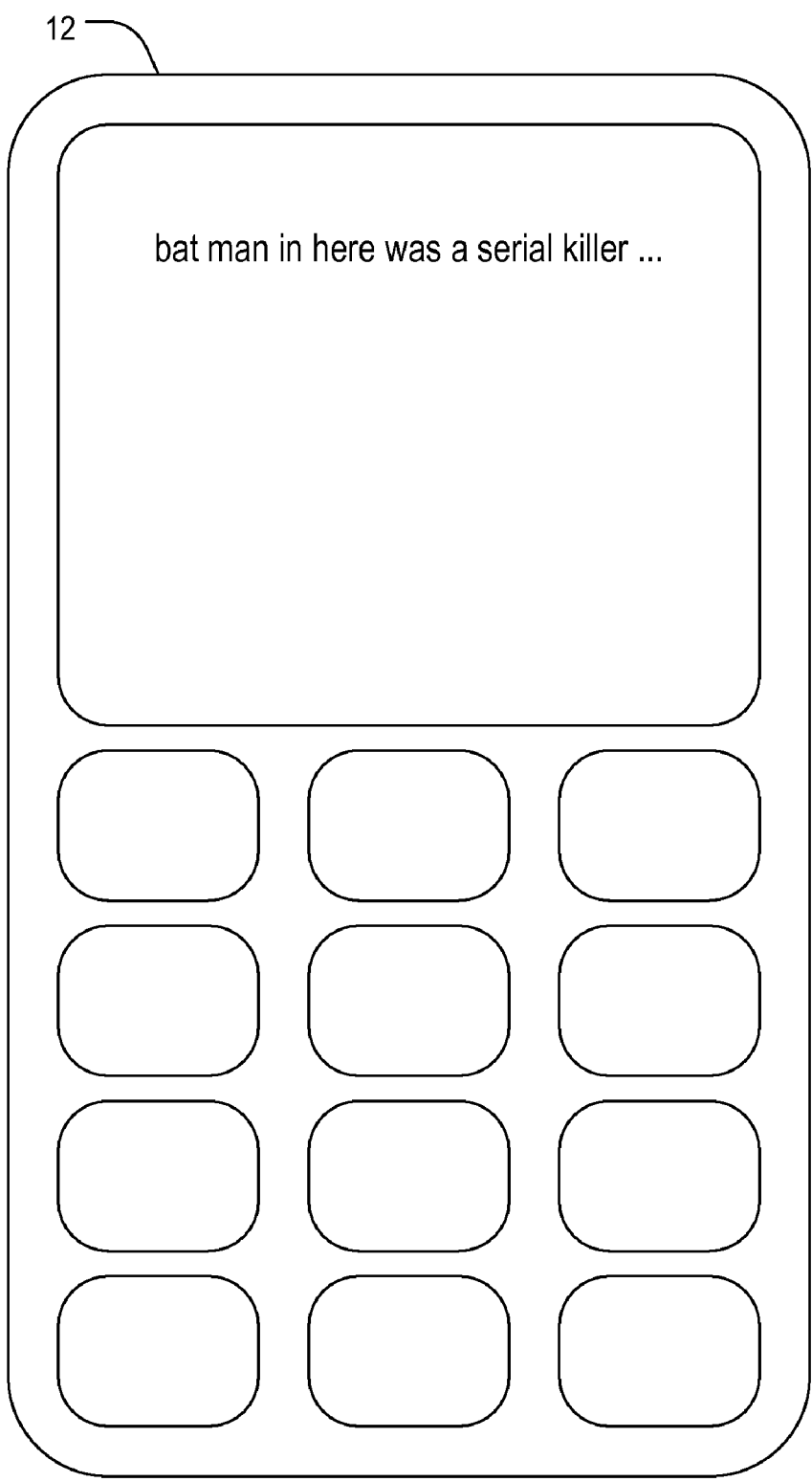
Figure 6D:
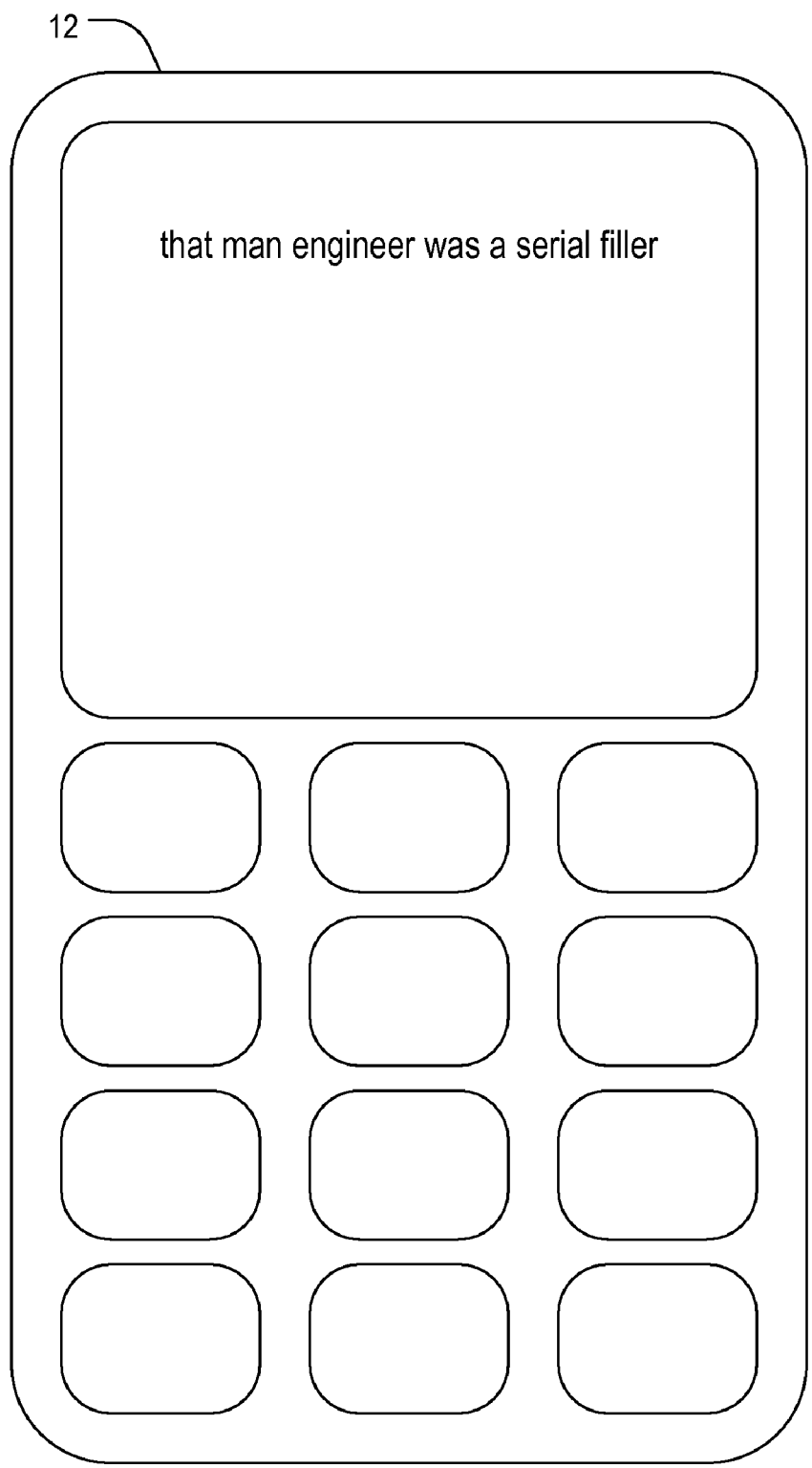
Figure 6E:
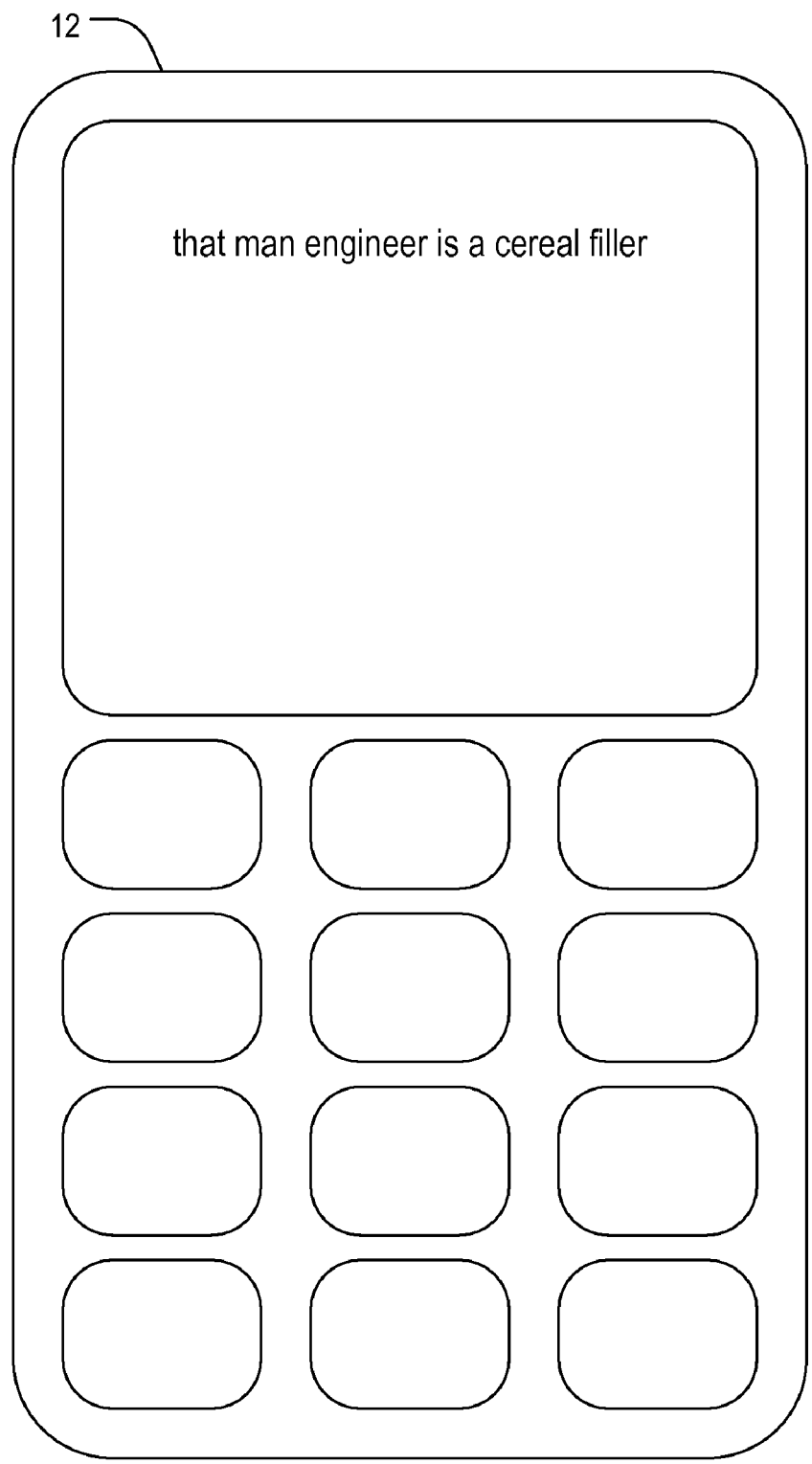

In the exemplary embodiment of the present invention as shown in FIG. 4, the recorded audio message V1 is first transmitted to the first transceiver tower 130A from the mobile phone 12. The first transceiver tower 130A outputs the audio message V1 into an audio message V2 that is, in turn, transmitted to the mobile communication service provider 140. Then the mobile communication service provider 140 outputs the audio message V2 into an audio message V3 and transmits it (V3) to the Internet 150. The Internet 150 outputs the audio message V3 into an audio message V4 and transmits it (V4) to the backend server 160. The content of all the audio messages V1-V4 is identical.

The backend server 160 then converts the audio message V4 into a text message, T1, and/or a digital signal, D1, in the backend server 160 by means of a speech recognition algorithm including a grammar algorithm and/or a transcription algorithm. The text message T1 and the digital signal D1 correspond to two different formats of the audio message V4. The text message T1 and/or the digital signal D1 are sent back to the Internet 150 that outputs them into a text message T2 and a digital signal D2, respectively.

The digital signal D2 is transmitted to a digital receiver 180, generally defined as a receiving device 14 equipped to communicate with the Internet and capable of receiving the digital signal D2. In at least some embodiments, the digital receiver 180 is adapted for receiving a digital signal converted from an audio message created in the mobile phone 12. Additionally, in at least some embodiments, the digital receiver 180 is also capable of receiving an audio message from the mobile phone 12. A conventional computer is one example of a digital receiver 180. In this context, a digital signal D2 may represent, for example, an email or instant message.

It should be understood that, depending upon the configuration of the backend server 160 and software installed on the mobile phone 12, and potentially based upon the system set up or preferences of the user 32, the digital signal D2 can either be transmitted directly from the backend server 160 or it can be provided back to the mobile phone 12 for review and acceptance by the user 32 before it is sent on to the digital receiver 180.

The text message T2 is sent to the mobile communication service provider 140 that outputs it (T2) into a text message T3. The output text message T3 is then transmitted to the first transceiver tower 130A. The first transceiver tower 130A then transmits it (T3) to the mobile phone 12 in the form of a text message T4. It is noted that the substantive content of all the text messages T1-T4 may be identical, which are the corresponding text form of the audio messages V1-V4.

Upon receiving the text message T4, the user 32 verifies it and sends the verified text message V/T1 to the first transceiver tower 130A that in turn, transmits it to the mobile communication service provider 140 in the form of a verified text V/T2. The verified text V/T2 is transmitted to the second transceiver tower 130B in the form of a verified text V/T3 from the mobile communication service provider 140. Then, the transceiver tower 130B transmits the verified text V/T3 to the mobile devices 170.

In at least one implementation, the audio message is simultaneously transmitted to the backend server 160 from the mobile phone 12, when the user 32 speaks to the mobile phone 12. In this circumstance, it is preferred that no audio message is recorded in the mobile phone 12, although it is possible that an audio message could be both transmitted and recorded.

Such a system 10 may be utilized to convert an audio message into a text message. In at least one implementation, this may be accomplished by first initializing a transmitting device so that the transmitting device is capable of communicating with a backend server 160. Second, a user 32 speaks to or into the client device 12 so as to create a stream of an audio message. The audio message can be recorded and then transmitted to the backend server 160, or the audio message can be simultaneously transmitted to the backend server 160 through a client-server communication protocol. Streaming may be accomplished according to processes described elsewhere herein and, in particular, in FIG. 4, and accompanying text, of the aforementioned U.S. Patent Application Pub. No. US 2007/0239837. The transmitted audio message is converted into the text message in the backend server 160. The converted text message is then sent back to the client device 12. Upon the user's verification, the converted text message is forwarded to one or more recipients 34 and their respective receiving devices 14, where the converted text message may be displayed on the device 14. Incoming messages may be handled, for example, according to processes described elsewhere herein and, in particular, in FIG. 2, and accompanying text, of the aforementioned U.S. Patent Application Pub. No. US 2007/0239837.

Still further, in at least one implementation, one or both types of client device 12,14 may be located through a global positioning system (GPS); and listing locations, proximate to the position of the client device 12,14, of a target of interest may be presented in the converted text message.

Furthermore, in converting speech to text, speech transcription performance indications may be provided to the receiving user 34 in accordance with the disclosure of U.S. patent application Ser. No. 12/197,213, filed Aug. 22, 2008 and entitled "CONTINUOUS SPEECH TRANSCRIPTION PERFORMANCE INDICATION," which, together with any corresponding patent application publications thereof, is hereby incorporated herein by reference.

Additionally, in the context of SMS messaging, the ASR system preferably makes use of both statistical language models (SLMs) for returning results from the audio data, and finite grammars used to post-process the text results, in accordance with the disclosure of U.S. patent application Ser. No. 12/198,112, filed Aug. 25, 2008 and entitled "FILTERING TRANSCRIPTIONS OF UTTERANCES," which, together with any corresponding patent application publications thereof, is incorporated herein by reference. This is believed to result in text messages that are formatted in a way that looks more typical of how a human would have typed the text message using a mobile device.

The ASR system 18 transmits the text back to the originating device 12. Once this device 12 receives the transcribed text, it preferably displays the message to the transmitting user 32 for verification and editing as necessary, and upon approval by the user, the text may be formatted into a text message or instant message that may be transmitted to a destination communication device such as the receiving device 14 described previously. If not already selected or pre-set, the user 32 selects a desired phone number or other destination address stored in memory on the transmitting device 12 or in a remote server or inputs a number or other address via one or more input elements, and an outgoing message signal corresponding to the number or address is transmitted. Voice commands may be utilized to control such functionality, and such a process may be implemented, for example, in accordance with the disclosure of U.S. patent application Ser. No. 12/355,319, filed Jan. 16, 2009 and entitled "USING A PHYSICAL PHENOMENON DETECTOR TO CONTROL OPERATION OF A SPEECH RECOG- NITION ENGINE," which, together with any corresponding patent application publications thereof, is incorporated herein by reference.

FIG. 5 is a table listing a sequence of transcription results as they form in real time during a speech recognition operation. Initially, as shown at time sequence #1, no results whatsoever are formed, but the ASR system 18 quickly begins to form preliminary results, as shown by the partial results " . . . . . . . . . . . . . was . . . . . . . . . . . . . " and " . . . . . . " . . . . . . was uh . . . . . . . . . . . . " at time sequence #2 and #3, respectively. The sequences of dots in the preliminary results indicate fragments or portions of the utterance 36 for which the engine in the ASR system 18 has yet to produce results. It will be noted that the first portions of the utterance 36 that are transcribed are in the middle of the utterance, rather than in some sequential portion of the utterance. This is because an ASR system 18 does not necessarily produce results starting from the beginning and moving to the end of an utterance 36, and thus it is quite possible that gaps can occur at any part of an utterance 36.

As time goes on, the results are further refined, with more portions of the utterance 36 being transcribed and refined. By time sequence #10, the ASR system 18 has formed a transcription result of " . . . . . . . . . ear was uh see real . . . . . . ;" by time sequence #20, the ASR system 18 has formed a transcription result of "bat man in here was uh see real . . . . . . ;" by time sequence #30, the ASR system 18 has formed a transcription result of "bat man in here was a serial killer;" by time sequence #40, the ASR system 18 has formed a transcription result of "that man engineer was a serial filler;" and finally, at time sequence #50, the ASR system 18 has formed a transcription result of "that man engineer is a cereal filler." It will be appreciated that the results may change rapidly during the earlier portions of the process, but slow down toward the latter portions of the process. This is typical of the operation of an ASR engine.

Referring again to FIG. 5, as the ASR system 18 operates on an utterance 36, it may form initial results, and then refine those results over time as it continues to process the utterance 36. As the initial and intermediate results are formed, they may be returned in real-time to the transmitting user 32 to provide a contemporaneous visual indication to the user 32 of how the ASR system 18 arrived at its results. FIGS. 6A-6E are graphical depictions, on a transmitting device 12, of the transcription of the utterance 36 of FIG. 3 at time sequence #10, #20, #30, #40 and #50, respectively. The real-time transition through intermediate results to final results, as displayed to the user 32, is sometimes referred to herein as an "animation." Although the intermediate results and resulting animation change quickly as they are displayed to the user on the transmitting device 12, a typical user 32 is still able, by watching closely, to discern those intermediate results, thereby learning what intermediate results were reached before the ASR engine reaches the final results.

If the final results are the ones desired by the user 32, then the user 32 may not care how the ASR engine arrived at them; i.e., the user 32 may not care what intermediate results were reached before the ASR engine reached the final results. However, if the final results are not the ones desired by the user 32, then the user 32 may find it useful to have seen whether the ASR engine arrived at the desired results but then subsequently replaced the desired results with what it determined to be more likely results, or whether the ASR engine never arrived at the desired result at all. For example, if the intermediate transcription results returned by the ASR system 18 indicated that the ASR engine arrived at the desired results but then replaced them with different results, the user 32 may choose to begin the process again, but paying particular attention, when speaking the utterance 36, to how he or she pronounces, modulates or otherwise utters the portion of the utterance 36 for which desired results were not achieved, all in the hope that the ASR system 18 returns the proper results on this new attempt, whereas if the intermediate transcription results returned by the ASR system 18 indicated that the ASR engine never arrived at the desired results at all, the user 32 may choose instead to manually edit the transcription presented on the transmitting device 12 rather than speaking the utterance 36 again and waiting for new transcription results. Of course, the user's chosen response may depend on his experience with using the system 10, but it is believed that real-time presentation of the initial and intermediate transcription results to the user 32 via the aforementioned animation may assist the user in deciding upon the best course of action.

Figure 7:
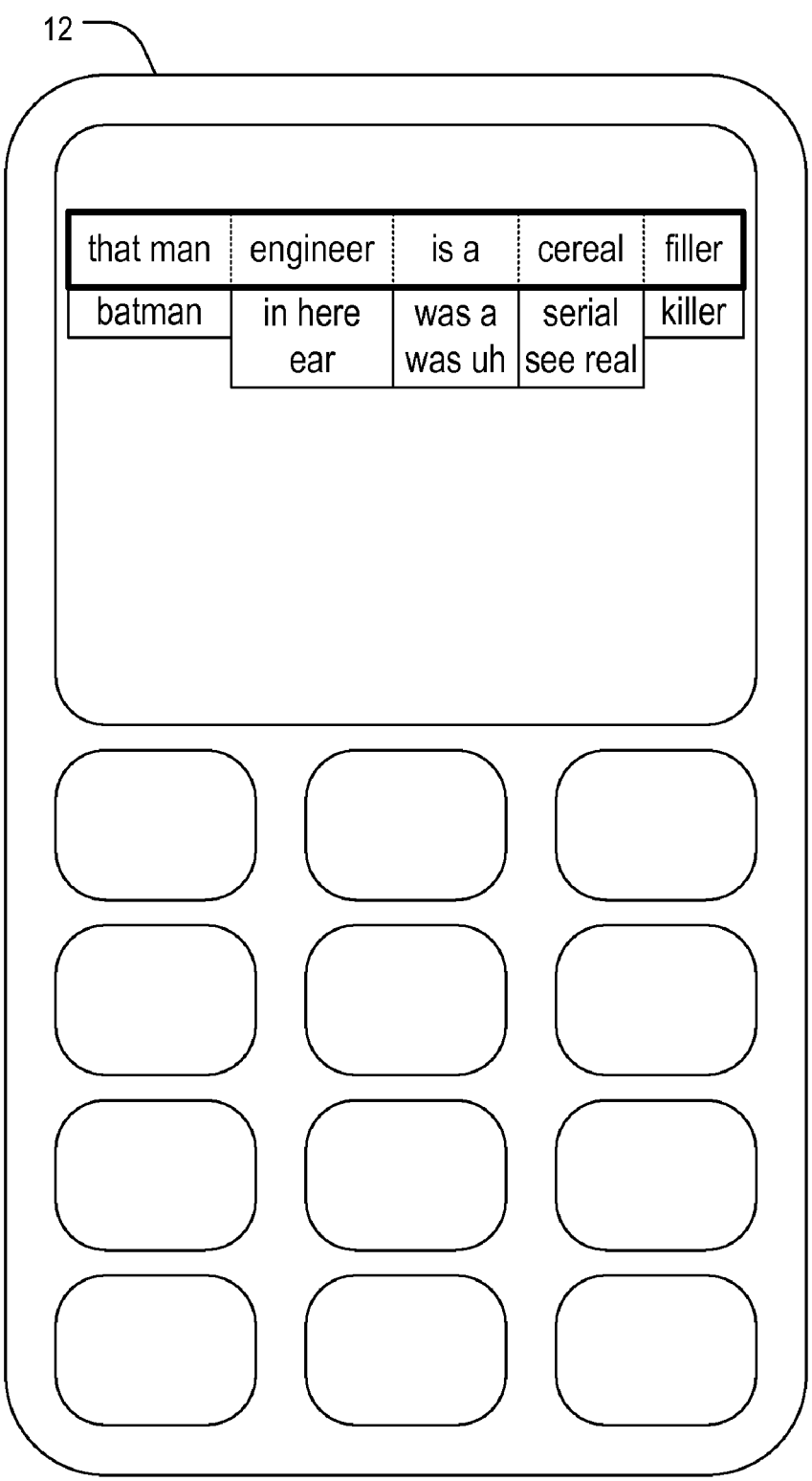
FIG. 7 is a graphical depiction, on a transmitting device, of the transcription of the utterance of FIG. 3, illustrating the various alternatives reached by the ASR engine for each portion of the utterance.

In another approach, the user 32 may be presented with the intermediate results and the final results at the same time. In particular, the intermediate results may be presented as alternative results to the final results at which the ASR engine arrived. FIG. 7 is a graphical depiction, on a transmitting device 12, of the transcription of the utterance 36 of FIG. 3, illustrating the various alternatives reached by the ASR engine for each portion of the utterance 36. The final transcription result, representing the result in which the ASR engine has the highest confidence level, is presented at the top. Other options considered by the ASR engine for various portions or fragments of the utterance 36 are presented beneath the final, highest-confidence result. More particularly, "batman" is presented as a previously-considered result for the utterance fragment that became "that man;" "in here" and "ear" are presented as previously-considered results for the utterance fragment that became "engineer;" "was a" and "was uh" are presented as previously-considered results for the utterance fragment that became "is a;" "serial" is presented as a previously-considered result for the utterance fragment that became "cereal;" and "killer" is presented as a previously-considered result for the utterance fragment that became "filler." As described previously, the presentation of such information may aid the user 32 in determining whether to manually edit the transcription result presented or to speak the utterance 36 again and wait for new transcription results.

Figure 8A:
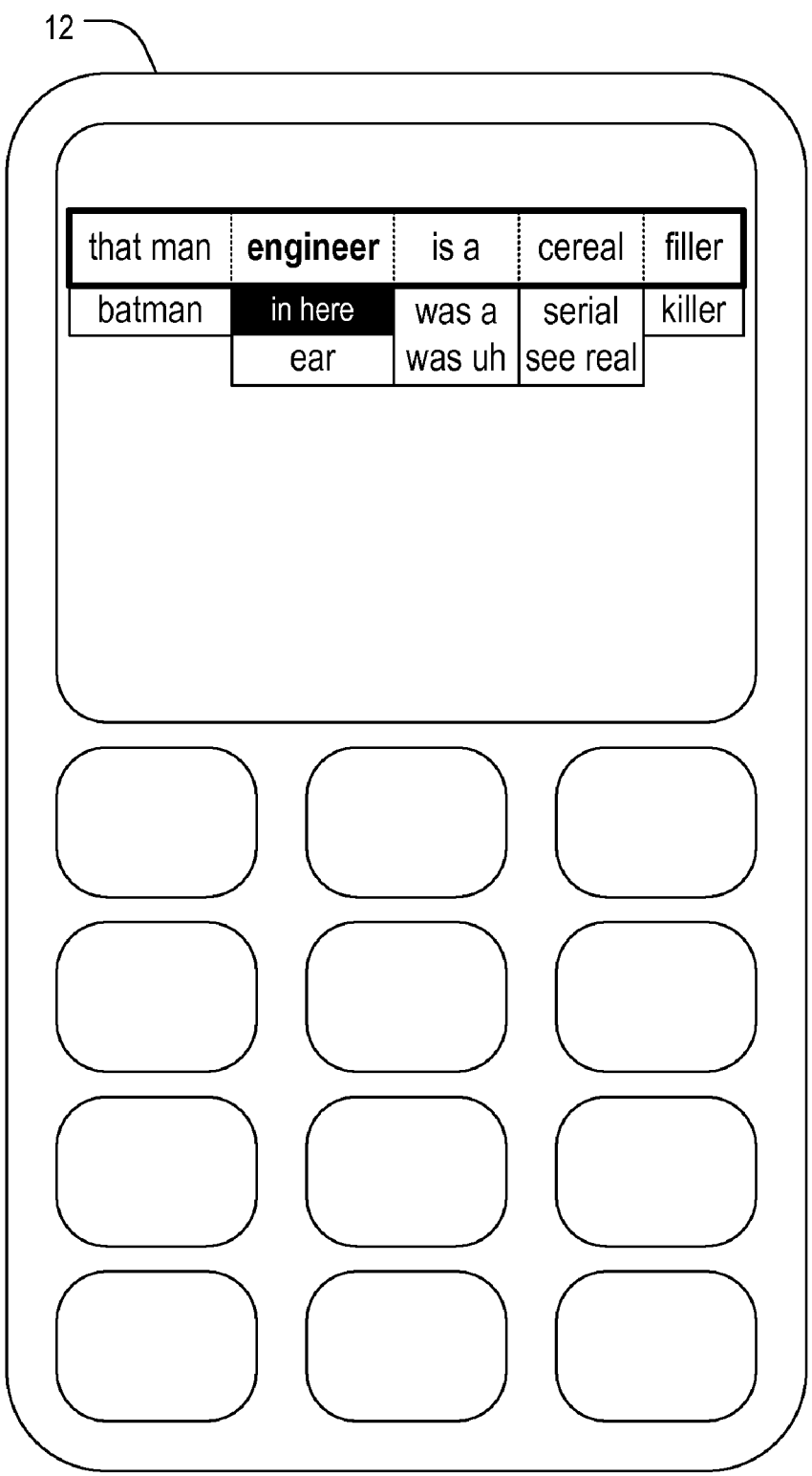
FIGS. 8A-8C are graphical depictions, on a transmitting device, of the transcription of the utterance of FIG. 3, illustrating the selection and replacement of an alternative result reached by the ASR system for one portion of the utterance.
Figure 8B:
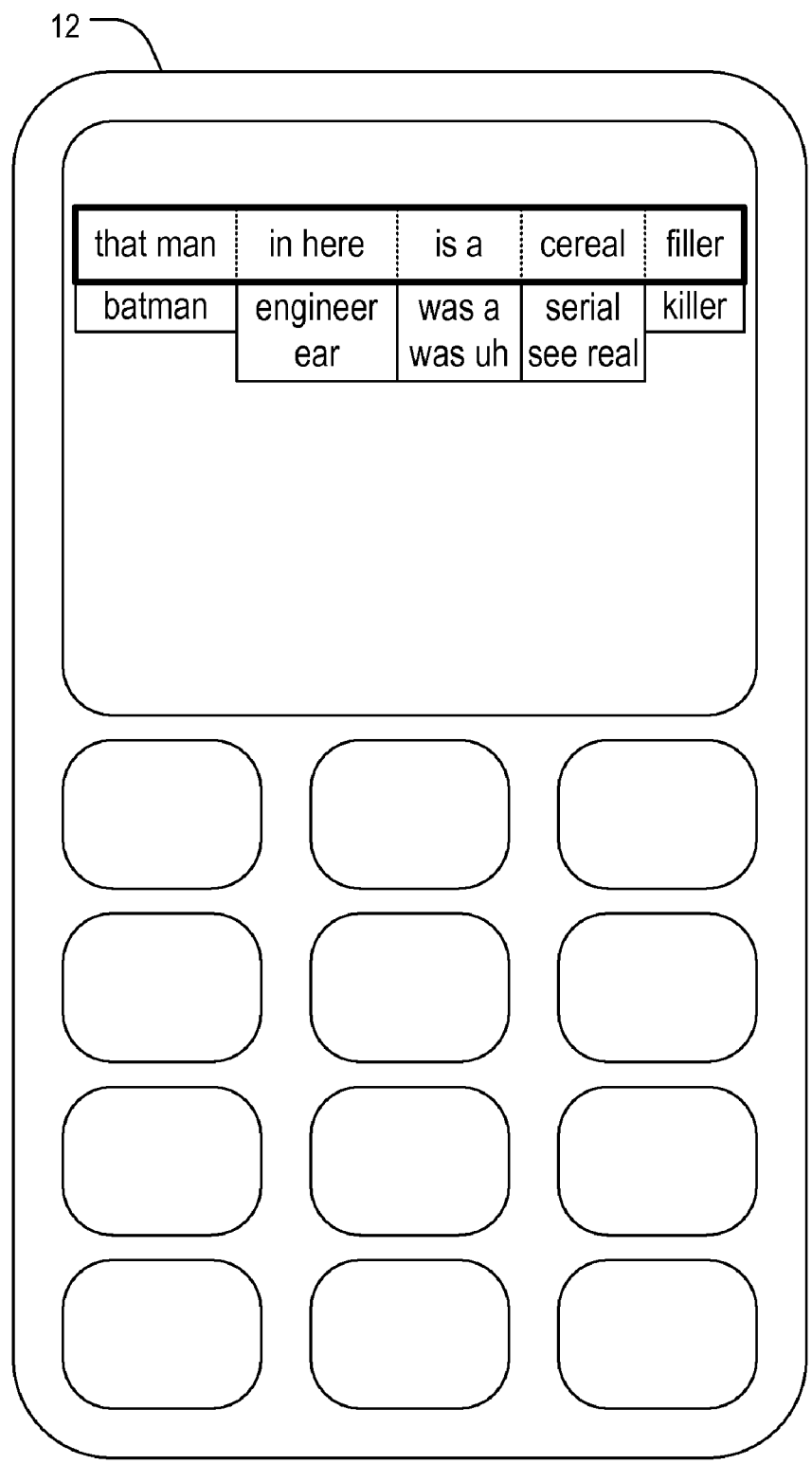
Figure 8C:
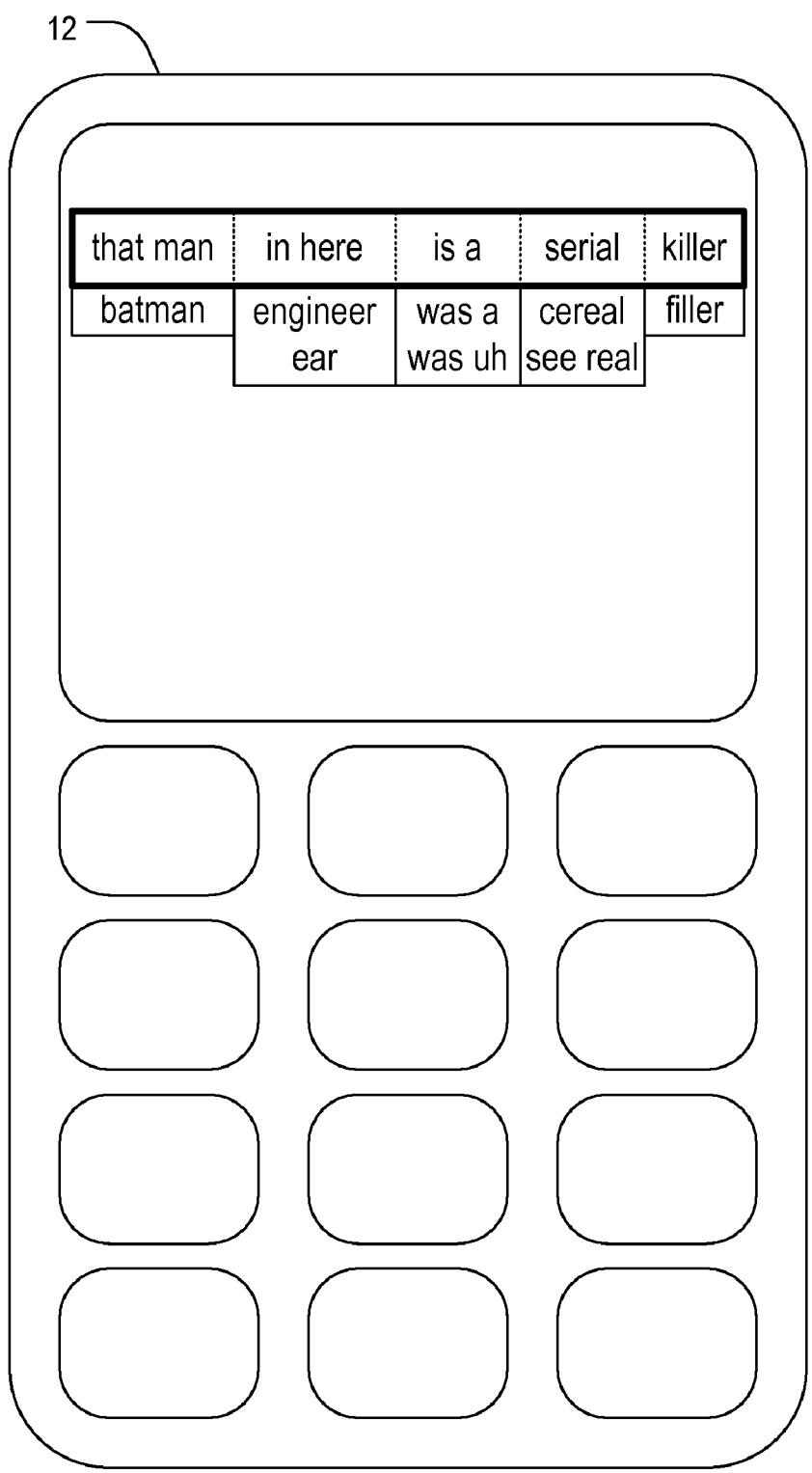

In addition, however, the various previously-considered results may be presented to the user 32 as selectable alternatives for the respective utterance fragments. FIGS. 8A-8C are graphical depictions, on a transmitting device 12, of the transcription of the utterance 36 of FIG. 3, illustrating the selection and replacement of an alternative result reached by the ASR engine for one portion of the utterance 36. In FIG. 8A, the user 32 has selected the utterance fragment with the final result "engineer" for replacement, and the previously-considered result "in here" is highlighted. In FIG. 8B, the user 32 has gone ahead and replaced "engineer" with "in here," producing the edited final result of "that man in here is a cereal filler." By further replacing the final result "cereal" with "serial" and the final result "filler" with "killer," the user 32 is able to reach the intended result of "that man in here is a serial killer," as shown in FIG. 8C. Selection may be accomplished in any conventional manner, including manipulation of input keys, buttons or the like on the device 12, use of a stylus or other external tool, voice activation, or the like.

Figure 9:
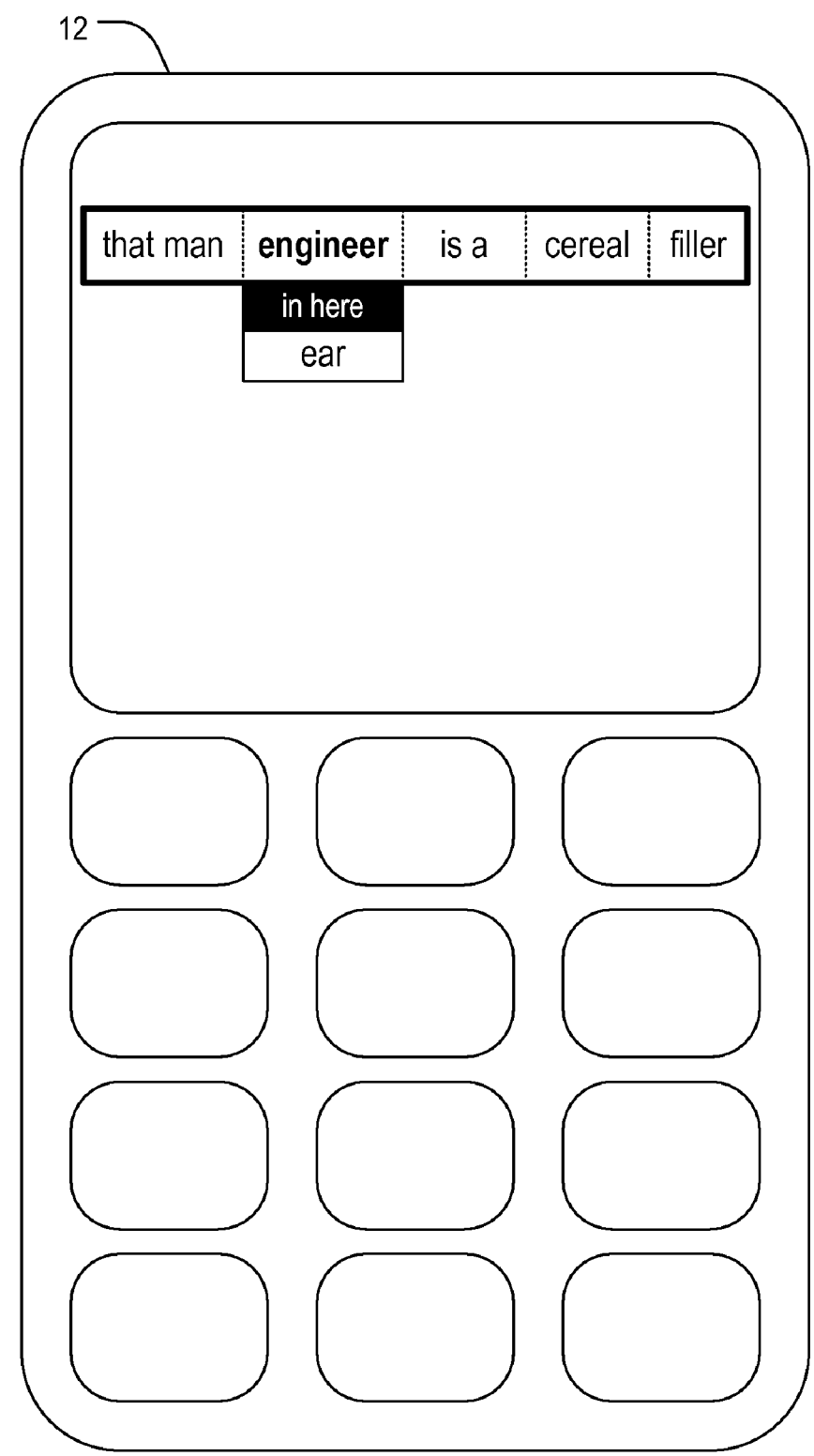
FIG. 9 is a graphical depiction, on a transmitting device, of the transcription of the utterance of FIG. 3, illustrating the display of alternative results for only one of the utterance fragments at a time.
Figure 10A:
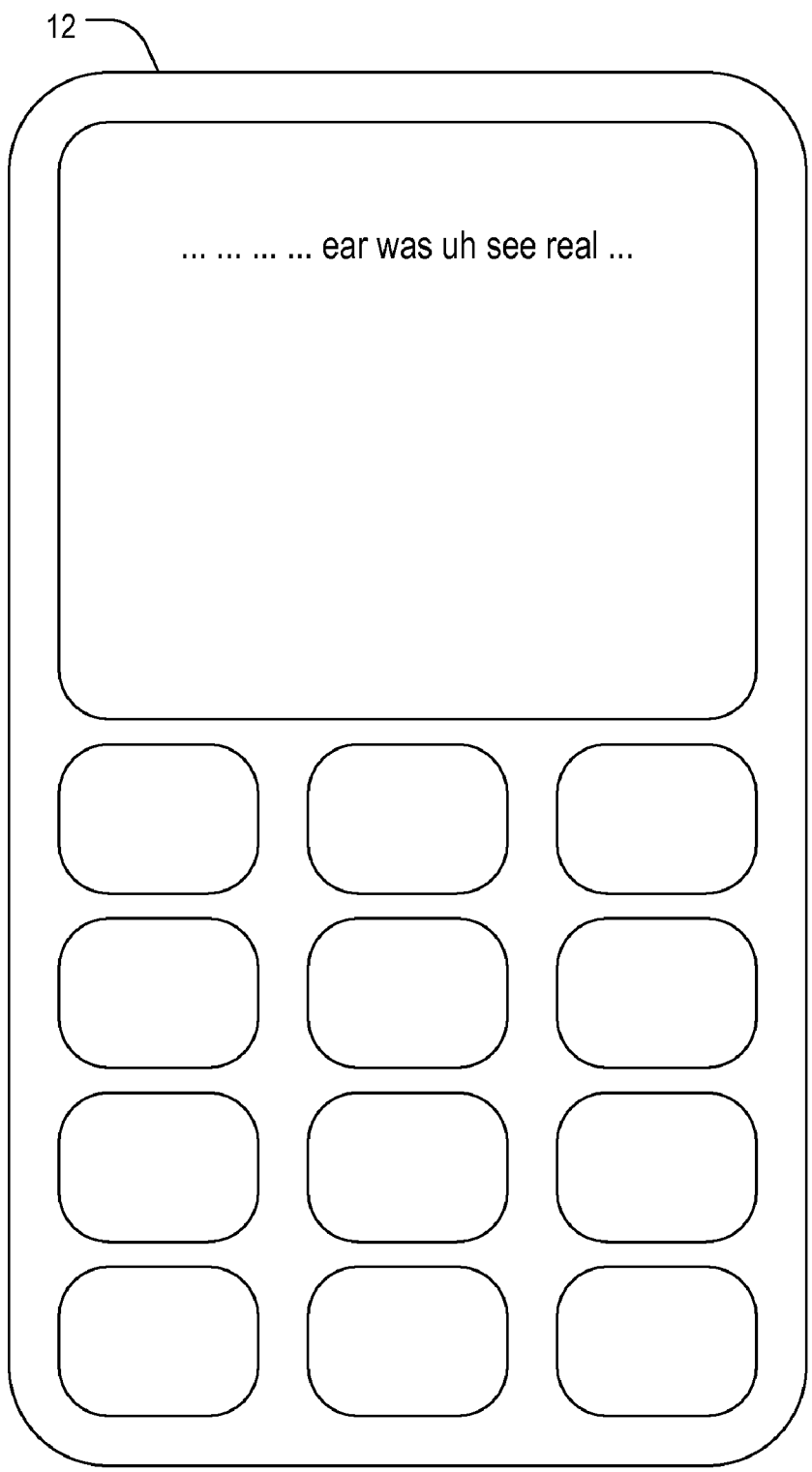
FIGS. 10A-10E are graphical depictions, on a transmitting device, of the transcription of the utterance of FIG. 3 at time sequence #10, #20, #30, #40 and #50, respectively, wherein previous transcription results are displayed together with current transcription results.
Figure 10B:
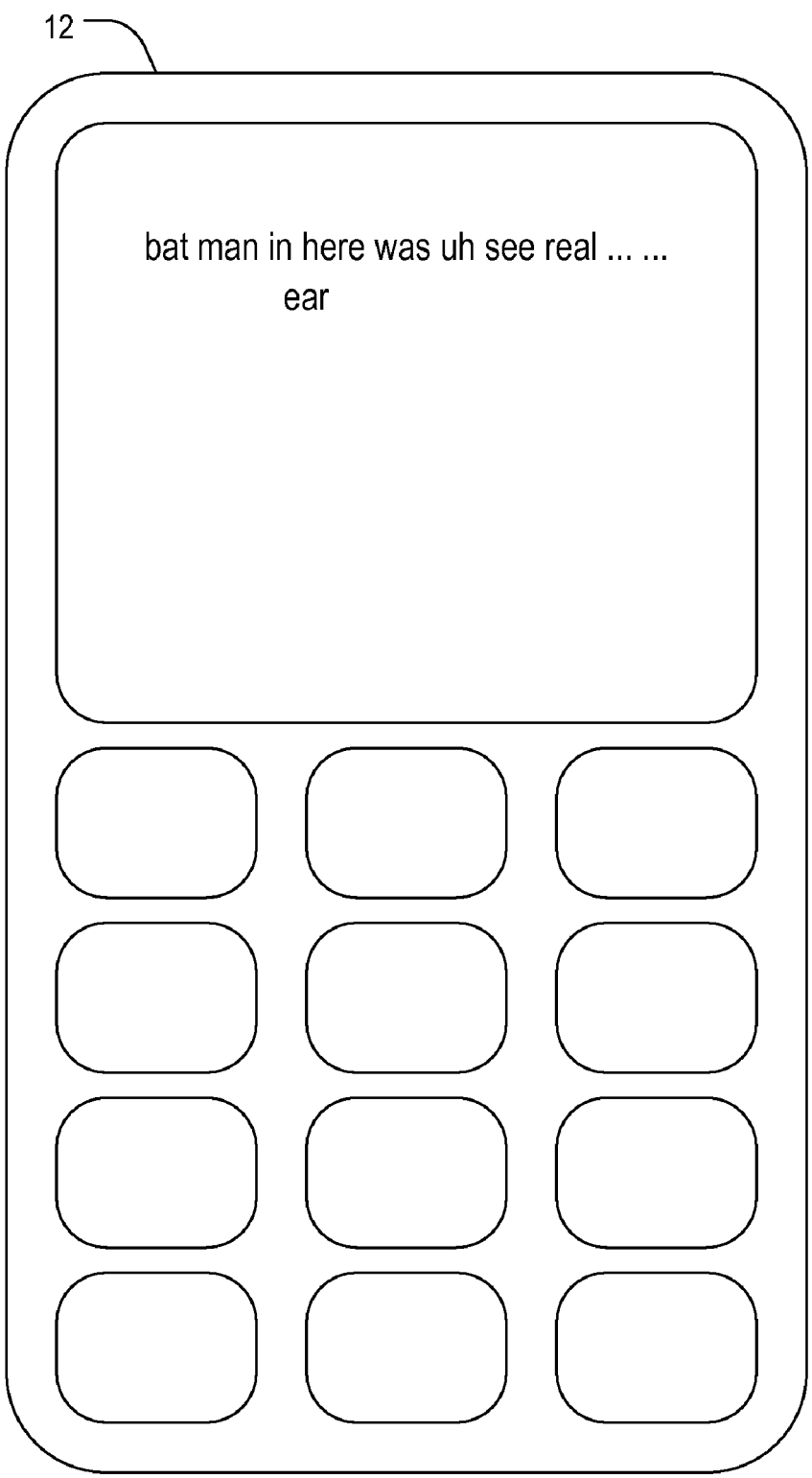
Figure 10C:
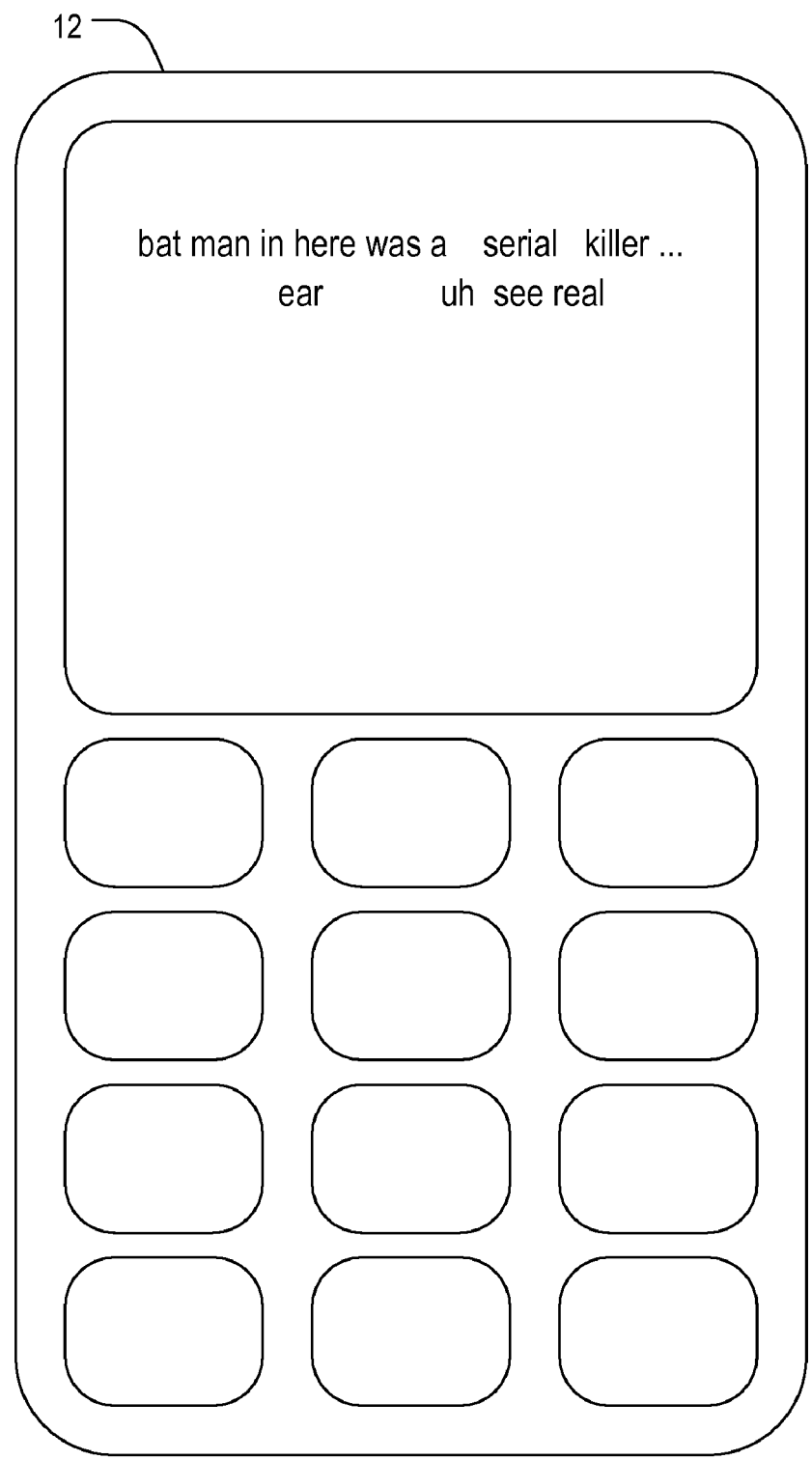
Figure 10D:
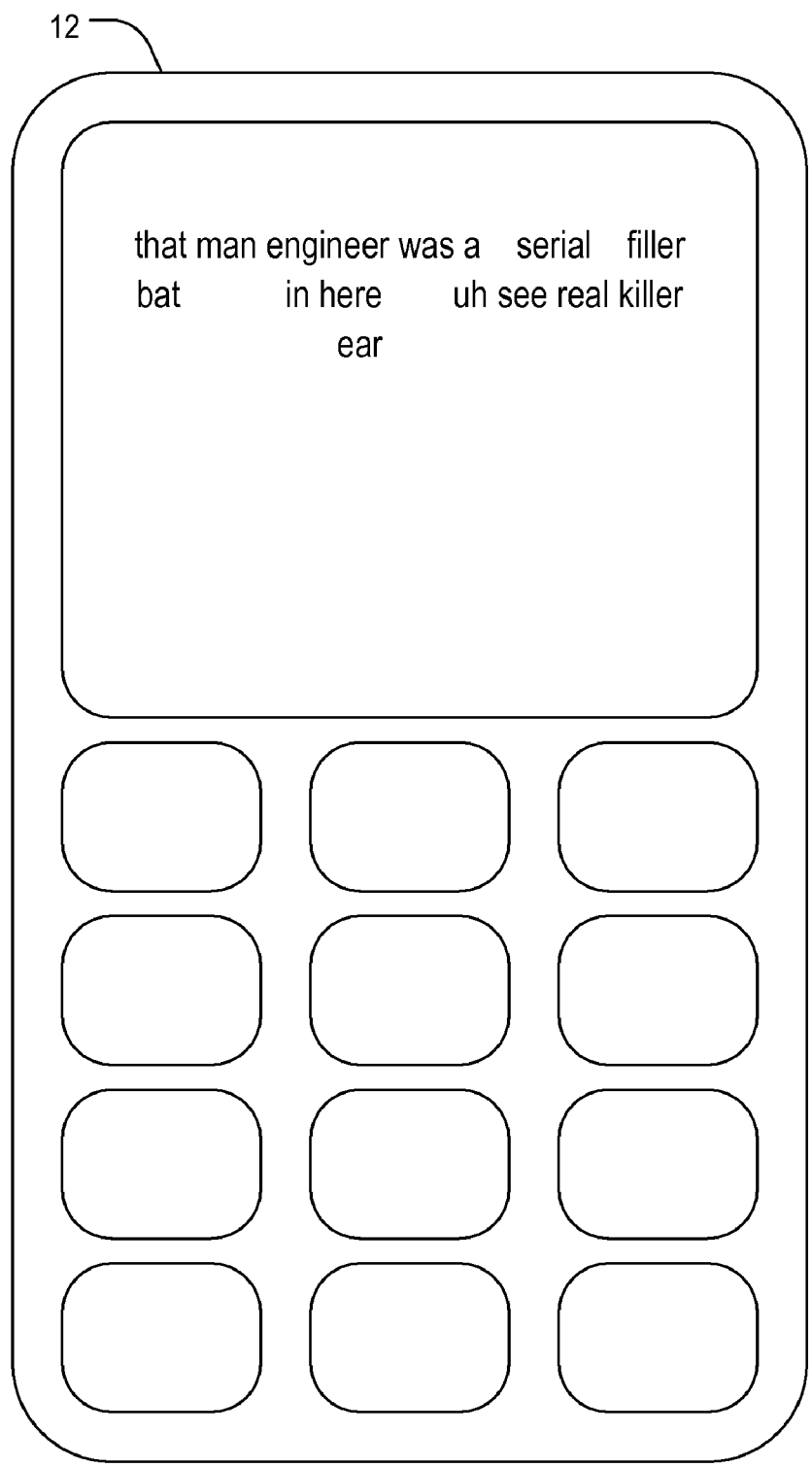
Figure 10E:
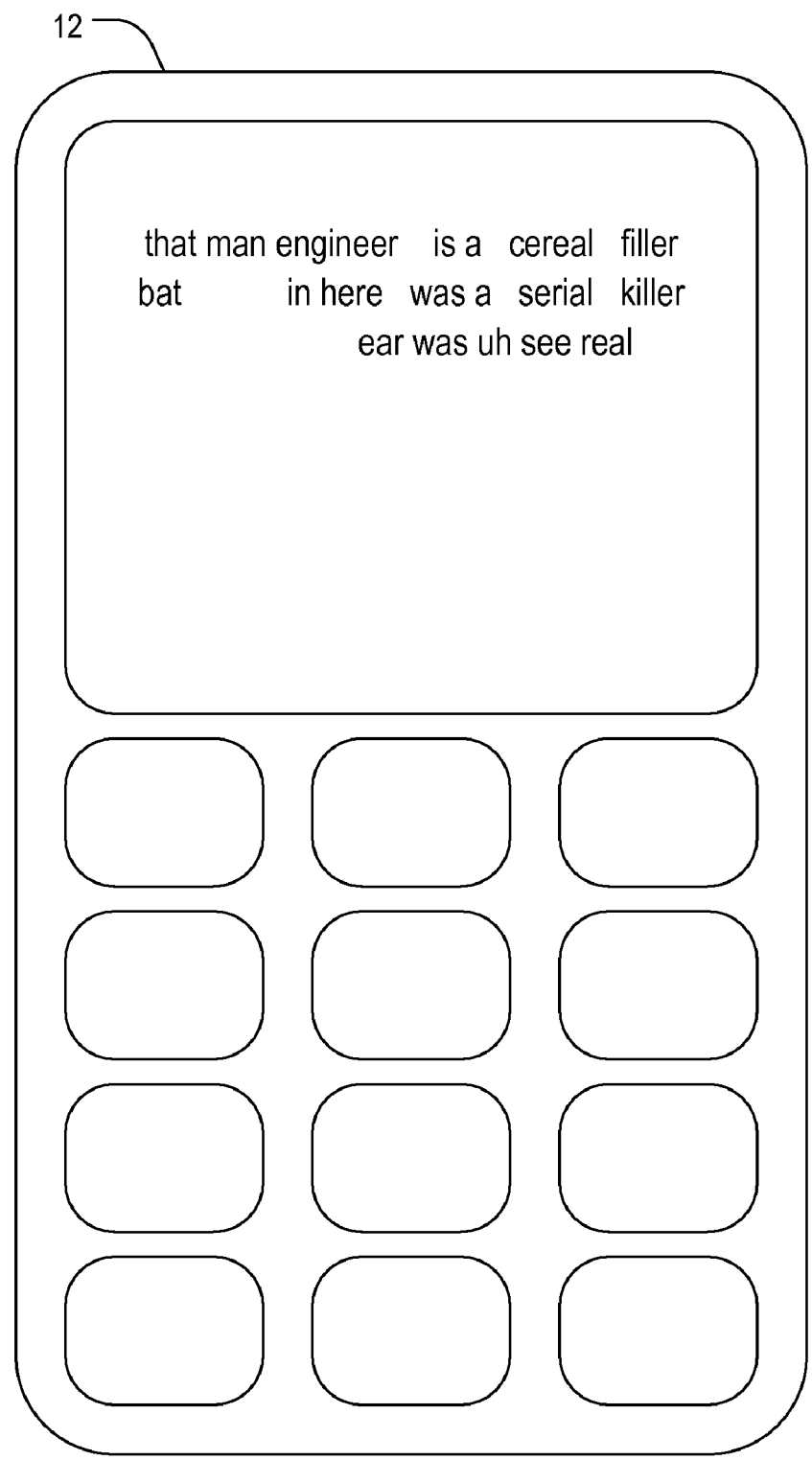

It will be appreciated that in the arrangement depicted in FIGS. 8A-8C, the alternatives for each utterance fragment are displayed with the results in having the highest confidence levels first, followed by successively lower results ordered beneath, but that alternative arrangements may instead be employed. For example, although it may be preferable to display the final result first, the various other alternatives for each utterance fragment may instead be displayed alphabetically. Further, rather than having alternative results for all of the utterance fragments displayed simultaneously, it may be preferable to display alternative results for only one of the utterance fragments at a time. FIG. 9 is a graphical depiction, on a transmitting device 12, of the transcription of the utterance 36 of FIG. 3, illustrating the display of alternative results for only one of the utterance fragments at a time. It will still further be appreciated that the alternatives may be presented via a "drop-down list" or any other conventional display presentation means, tool or technique.

In at least one embodiment, the approaches described with regard to FIGS. 6A-6E and FIG. 7, respectively, may be combined together, wherein initial and intermediate results are displayed to the user 32 both as they are reached by the ASR engine and in conjunction with the display of the final results, wherein the initial and intermediate results are presented as alternatives. FIGS. 10A-10E are graphical depictions, on a transmitting device 12, of the transcription of the utterance 36 of FIG. 3 at time sequence #10, #20, #30, #40 and #50, respectively, wherein previous transcription results are displayed together with current transcription results. More particularly, in FIG. 10A, the transmitting device 12 displays the early transcription result of " . . . . . . . . . ear was uh see real . . . . . . ;" in FIG. 10B, the transmitting device 12 displays the intermediate transcription result of "bat man in here was uh see real . . . . . . ," together with a previous result for the utterance fragment "in here;" in FIG. 10C, the transmitting device 12 displays the intermediate transcription result of "bat man in here was a serial killer," together with previous results for the utterance fragments "in here," "a" and "serial;" in FIG. 10D, the transmitting device 12 displays the intermediate transcription result of "that man engineer was a serial filler," together with previous results for the utterance fragments "that," "engineer," "a," "serial" and "filler;" and finally, in FIG. 10E, the transmitting device 12 displays the final transcription result of "that man engineer is a cereal filler," together with previous results for the utterance fragments "that," "engineer," "is a," "cereal" and "filler."

Because the initial and intermediate results are likely to contain most or all of the transcription options that will be available in the final results, it makes sense to display the incremental results in an animated, real-time visual display, which then updates frequently as new information becomes available. In this way, the user 32 is exposed to most or all of the options that the ASR engine considered during transcription and can more easily navigate to those options, after transcription is complete, in order to select a transcription option different from the one chosen by the engine as having the highest confidence value.

Referring again to FIG. 7, it will be appreciated that each utterance fragment or portion, and its corresponding alternate transcriptions, may be a single word, or may be a phrase made up of multiple words. The drop-down lists, or any other graphical arrangement of alternate transcription fragments, can be displayed in an animated fashion after the entire transcription has been received. The lists of alternate transcription fragments can then be removed from the display leaving only the highest-confidence results visible.

Figure 11:
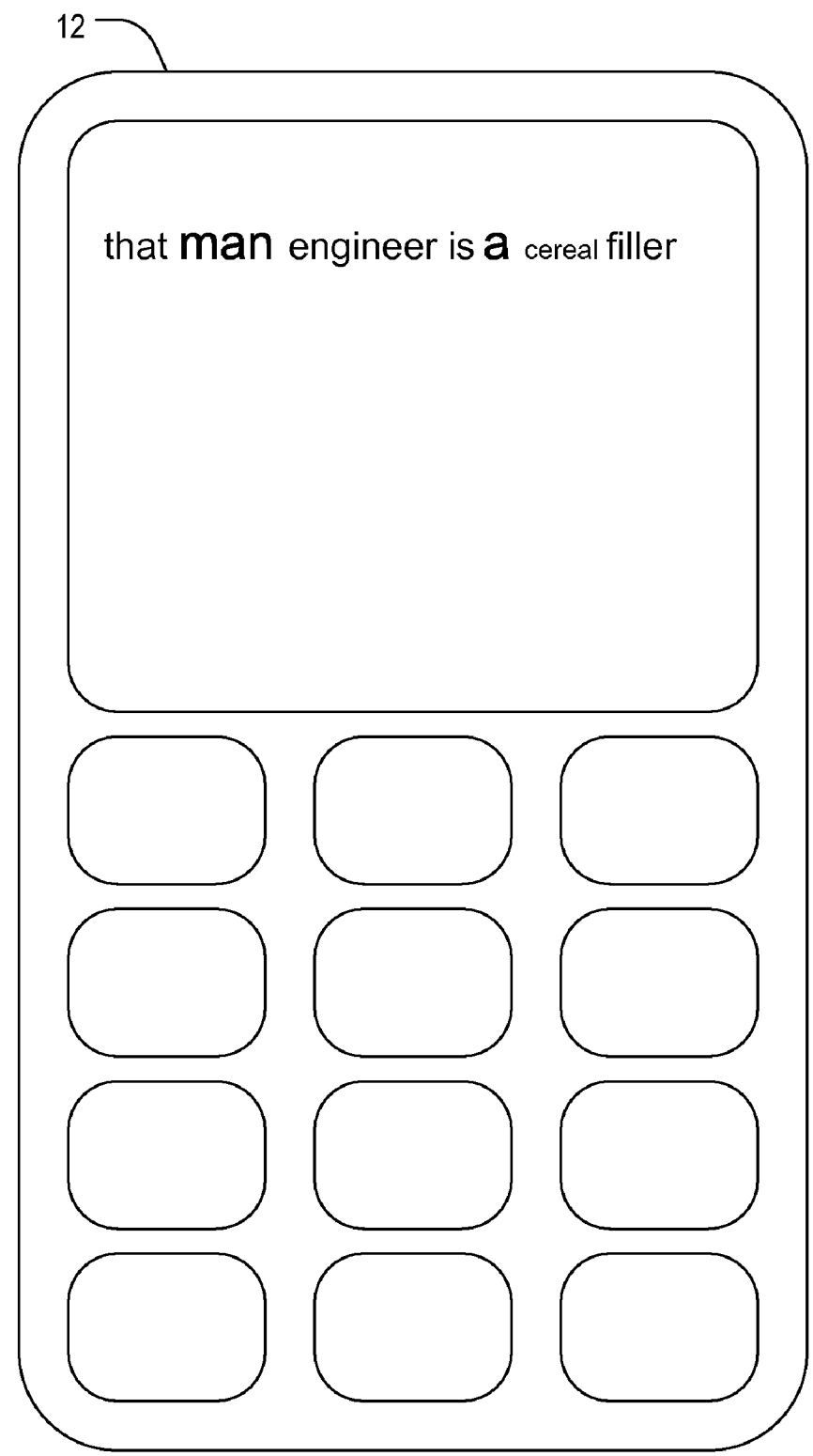
FIG. 11 is a graphical depiction, on a transmitting device, of the transcription of the utterance of FIG. 3 using performance indications for the words thereof.

The various approaches described herein may be also be used in conjunction with methods of providing speech transcription performance indications to the transmitting user 32 in accordance with the disclosure of U.S. patent application Ser. No. 12/197,213, filed Aug. 22, 2008 and entitled "CONTINUOUS SPEECH TRANSCRIPTION PERFORMANCE INDICATION," which, together with any corresponding patent application publications thereof, is hereby incorporated herein by reference. More particularly, methods described for use in providing indications of speech transcription performance to a receiving user 34 in such application and publications may likewise be utilized to provide the transmitting user 32 with indications of speech transcription performance. FIG. 11 is a graphical depiction, on a transmitting device 12, of the transcription of the utterance 36 of FIG. 3 using font size to indicate confidence level, wherein the words "man" and "a" appear in font size 18 to indicate a confidence level of 80-100%, the words "that," "engineer is" and "filler" appear in font size 14 to indicate a confidence level of 60-79%, and the word "cereal" appears in font size 10 to indicate a confidence level of 59% or below. It will be appreciated that the meaning of the various font sizes may be varied, greater or fewer numbers of font sizes may be used, different font sizes may be chosen, different thresholds may be chosen, or the like, all without departing from the scope of the invention. Other such performance indications are described in the referenced application and publications.

The techniques described herein have a number of advantages. Although the alternative transcription results for the various utterance fragments may appear only briefly, their appearance can still give a user 32 time to quickly scan and visually take in all of the alternative transcription results or options that the ASR system has returned. Knowing this information enables the user 32 to determine the relative difficulty of fixing a slightly misrecognized transcription, knowing that the correct transcription alternatives are present and easily accessible via drop-down menu lists, or other UI mechanisms. Or, if the user 32 perceives that the correct transcription alternatives are not present, they can then make a more informed decision as to whether it is easier to abandon the current transcription results entirely and retry the utterance and transcription cycle, or whether the transcription results can be corrected with a reasonable amount of manual editing of the transcription results.

The use of these two techniques, and others like them, can enhance the user experience when interacting with an ASR system 18, by saving time and speeding the repair of misrecognized utterances.

Commercial Implementation

One commercial implementation of the foregoing principles utilizes the Yap® and Yap9™ service (collectively, "the Yap service"), available from Yap Inc. of Charlotte, N.C. The Yap service includes one or more web applications and a client device application. The Yap web application is a J2EE application built using Java 5. It is designed to be deployed on an application server like IBM WebSphere Application Server or an equivalent J2EE application server. It is designed to be platform neutral, meaning the server hardware and OS can be anything supported by the web application server (e.g. Windows, Linux, MacOS X).

Figure 12:
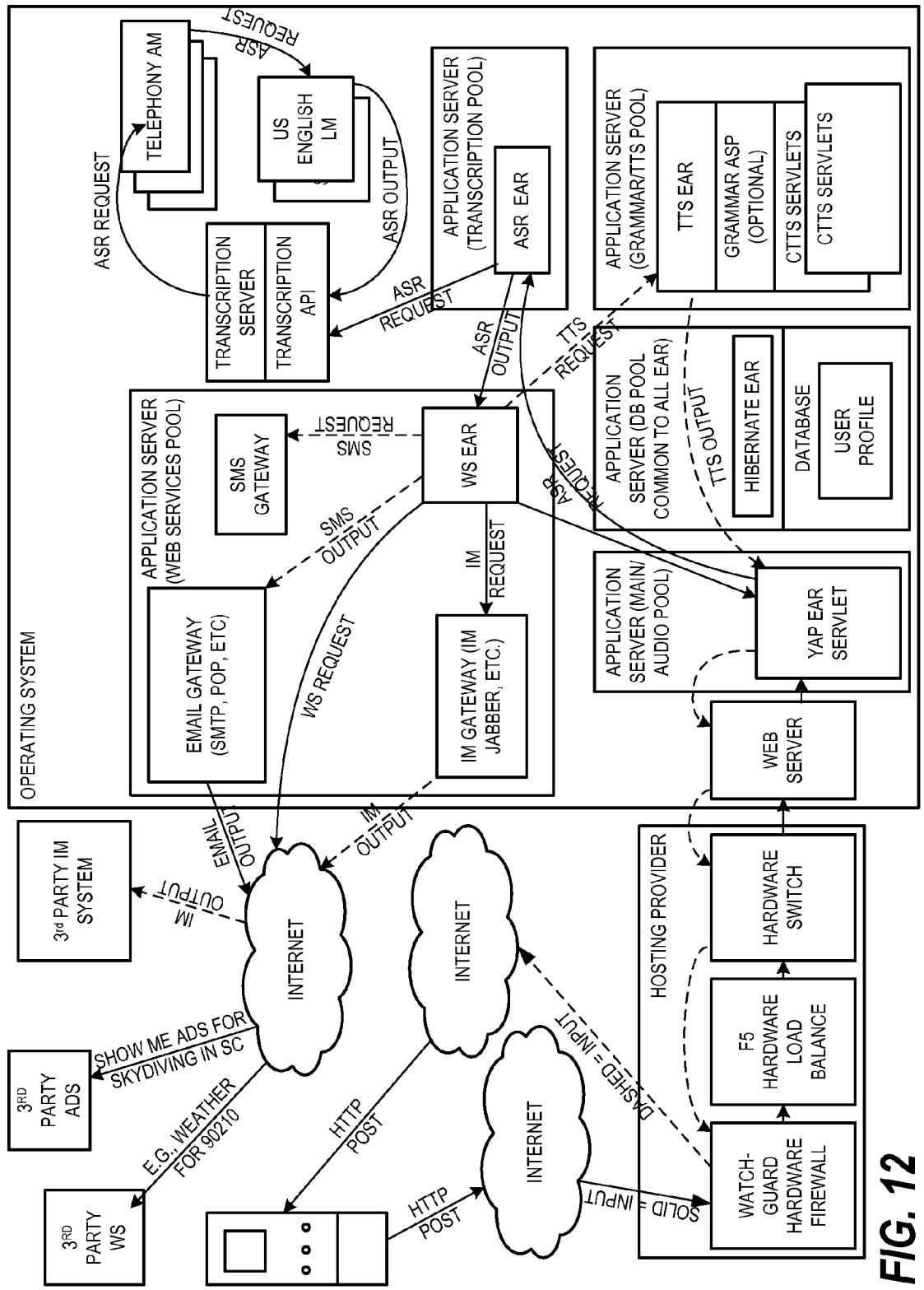
FIG. 12 is a block diagram of the system architecture of one commercial implementation.

FIG. 12 is a block diagram of the system architecture of the Yap commercial implementation. With reference to FIG. 12, the operating system may be implemented in Red Hat Enterprise Linux 5 (RHEL 5); the application servers may include the Websphere Application Server Community Edition (WAS-CE) servers, available from IBM; the web server may be an Apache server; the CTTS servlets may include CTTS servlets from Loquendo, including US/UK/ES male and US/UK/ES female; the Grammar ASP may be the latest WebSphere Voice Server, available from IBM; suitable third party ads may be provided by Google; a suitable third party IM system is Google Talk, available from Google; and a suitable database system is the DB2 Express relational database system, available from IBM.

Figure 13:
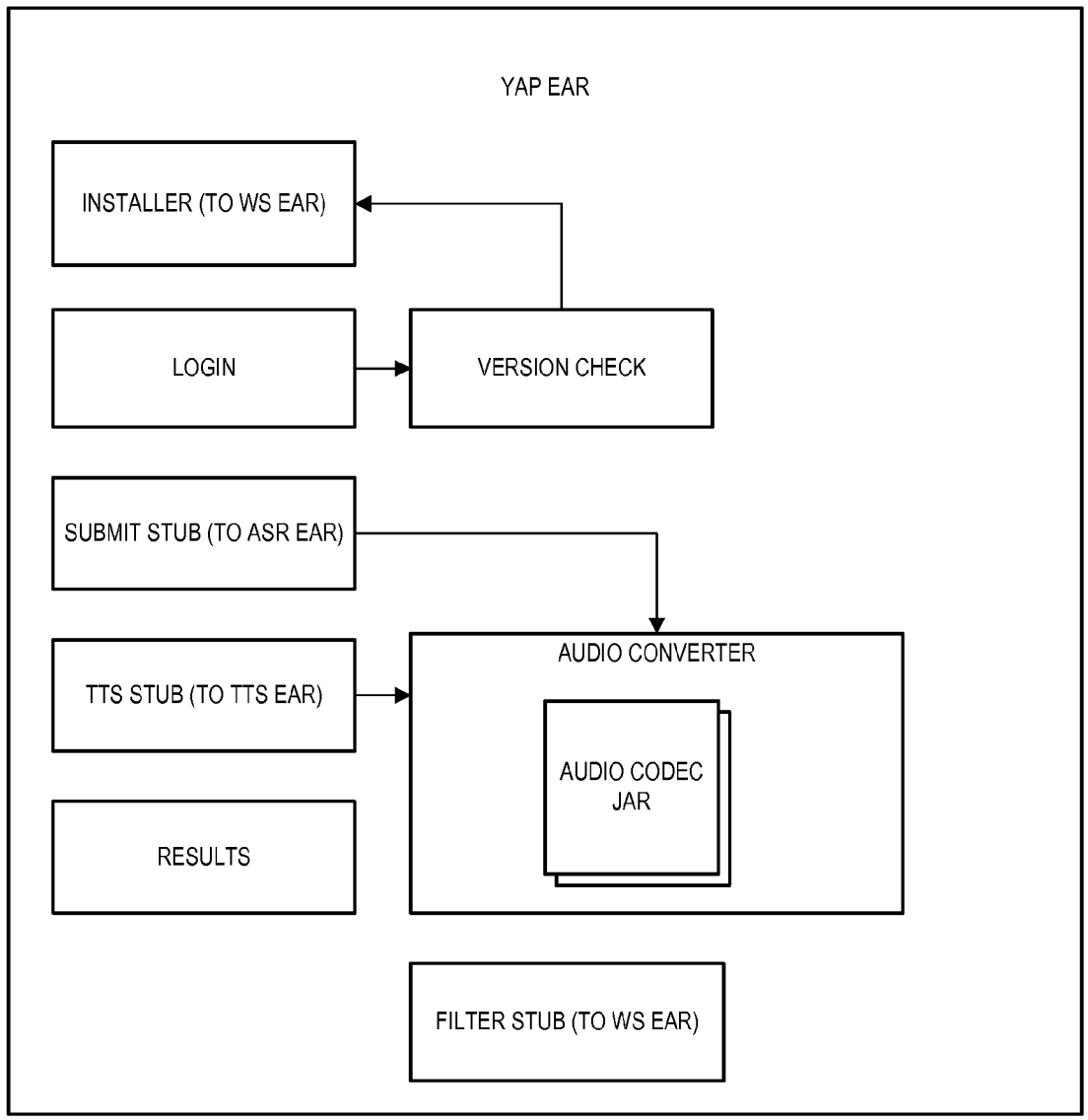
FIG. 13 is a block diagram of a portion of FIG. 12.

FIG. 13 is a block diagram of the Yap EAR of FIG. 12. The audio codec JARs may include the VoiceAge AMR JAR, available from VoiceAge of Montreal, Quebec and/or the QCELP JAR, available from Qualcomm of San Diego, Calif.

The Yap web application includes a plurality of servlets. As used herein, the term "servlet" refers to an object that receives a request and generates a response based on the request. Usually, a servlet is a small Java program that runs within a Web server. Servlets receive and respond to requests from Web clients, usually across HTTP and/or HTTPS, the HyperText Transfer Protocol. Currently, the Yap web application includes nine servlets: Correct, Debug, Install, Login, Notify, Ping, Results, Submit, and TTS. Each servlet is described below in the order typically encountered.

The communication protocol used for all messages between the Yap client and Yap server applications is HTTP and HTTPS. Using these standard web protocols allows the Yap web application to fit well in a web application container. From the application server's point of view, it cannot distinguish between the Yap client midlet and a typical web browser. This aspect of the design is intentional to convince the web application server that the Yap client midlet is actually a web browser. This allows a user to use features of the J2EE web programming model like session management and HTTPS security. It is also an important feature of the client as the MIDP specification requires that clients are allowed to communicate over HTTP.

More specifically, the Yap client uses the POST method and custom headers to pass values to the server. The body of the HTTP message in most cases is irrelevant with the exception of when the client submits audio data to the server in which case the body contains the binary audio data. The Server responds with an HTTP code indicating the success or failure of the request and data in the body which corresponds to the request being made. Preferably, the server does not depend on custom header messages being delivered to the client as the carriers can, and usually do, strip out unknown header values. FIG. 14 is a typical header section of an HTTP request from the Yap client.

The Yap client is operated via a user interface (UI), known as "Yap9," which is well suited for implementing methods of converting an audio message into a text message and messaging in mobile environments. Yap9 is a combined UI for SMS and web services (WS) that makes use of the buttons or keys of the client device by assigning a function to each button (sometimes referred to as a "Yap9" button or key). Execution of such functions is carried out by "Yaplets." This process, and the usage of such buttons, are described elsewhere herein and, in particular, in FIGS. 10A-10D, and accompanying text, of the aforementioned U.S. Patent Application Pub. No. US 2007/0239837.

Usage Process—Install: Installation of the Yap client device application is described in the aforementioned U.S. Patent Application Pub. No. US 2007/0239837 in a subsection titled "Install Process" of a section titled "System Architecture."

Usage Process—Notify: When a Yap client is installed, the install fails, or the install is canceled by the user, the Notify servlet is sent a message by the phone with a short description. This can be used for tracking purposes and to help diagnose any install problems.

Usage Process—Login: When the Yap midlet is opened, the first step is to create a new session by logging into the Yap web application using the Login servlet. Preferably, however, multiple login servers exist, so as a preliminary step, a request is sent to find a server to log in to. Exemplary protocol details for such a request can be seen in FIG. 15. An HTTP string pointing to a selected login server will be returned in response to this request. It will be appreciated that this selection process functions as a poor man's load balancer.

After receiving this response, a login request is sent. Exemplary protocol details for such a request can be seen in FIG. 16. A cookie holding a session ID is returned in response to this request. The session ID is a pointer to a session object on the server which holds the state of the session. This session data will be discarded after a period determined by server policy.

Sessions are typically maintained using client-side cookies, however, a user cannot rely on the set-cookie header successfully returning to the Yap client because the carrier may remove that header from the HTTP response. The solution to this problem is to use the technique of URL rewriting. To do this, the session ID is extracted from the session API, which is returned to the client in the body of the response. This is called the "Yap Cookie" and is used in every subsequent request from the client. The Yap Cookie looks like this:

;jsessionid=C240B217F2351E3C420A599B0878371A

All requests from the client simply append this cookie to the end of each request and the session is maintained:

/Yap/Submit;jsessionid=C240B217F2351E3C420A599B0878371A

Usage Process—Submit: After receiving a session ID, audio data may be submitted. The user presses and holds one of the Yap-9 buttons, speaks aloud, and releases the pressed button. The speech is recorded, and the recorded speech is then sent in the body of a request to the Submit servlet, which returns a unique receipt that the client can use later to identify this utterance. Exemplary protocol details for such a request can be seen in FIG. 17.

One of the header values sent to the server during the login process is the format in which the device records. That value is stored in the session so the Submit servlet knows how to convert the audio into a format required by the ASR engine. This is done in a separate thread as the process can take some time to complete.

The Yap9 button and Yap9 screen numbers are passed to the Submit server in the HTTP request header. These values are used to lookup a user-defined preference of what each button is assigned to. For example, the 1 button may be used to transcribe audio for an SMS message, while the 2 button is designated for a grammar based recognition to be used in a web services location based search. The Submit servlet determines the appropriate "Yaplet" to use. When the engine has finished transcribing the audio or matching it against a grammar, the results are stored in a hash table in the session.

In the case of transcribed audio for an SMS text message, a number of filters can be applied to the text returned from the ASR engine. Such filters may include, but are not limited to, those shown Table 1.

TABLE 1

| Filter Type | Function |
|---|---|
| Ad Filter | Used to scan the text and identify keywords that can be used to insert targeted advertising messages, and/or convert the keywords into hyperlinks to ad sponsored web pages |
| Currency Filter | Used to format currency returned from the speech engine into the user's preferred format. (e.g., "one hundred twenty dollars" -> "$120.00") |

TABLE 1-continued

| Filter Type | Function |
| --- | --- |
| Date Filter | Used to format dates returned from the speech engine into the user's preferred format. (e.g., "march fourth two thousand seven" -> "3/4/2007") |
| Digit Filter | User to format spelled out single digits returned from the speech engine into a multi-digit number such as a zip code (e.g., "two eight two one one" -> "28211") |
| Engine Filter | Used to remove speech engine words |
| Number Filter | Used to convert the spelled out numbers returned from the speech engine into a digit based number (e.g., "one hundred forty seven" -> "147") |
| Obscenity Filter | Used to place asterisks in for the vowels in street slang (e.g., "sh*t", "f*ck", etc.) |
| Punctuation Filter | Used to format punctuation |
| SMS Filter | Used to convert regular words into a spelling which more closely resembles an SMS message (e.g., "don't forget to smile" -> "don't 4get 2:)", etc.) |
| Time Filter | Used to format time phrases |

Notably, after all of the filters are applied, both the filtered text and original text are returned to the client so that if text to speech is enabled for the user, the original unfiltered text can be used to generate the TTS audio.

Usage Process—Results: The client retrieves the results of the audio by taking the receipt returned from the Submit servlet and submitting it as a request to the Results servlet. Exemplary protocol details for such a request can be seen in FIG. 18. This is done in a separate thread on the device and a timeout parameter may be specified which will cause the request to return after a certain amount of time if the results are not available. In response to the request, a block of XML is preferably returned. Exemplary protocol details for such a return response can be seen in FIG. 19. Alternatively, a serialized Java Results object may be returned. This object contains a number of getter functions for the client to extract the type of results screen to advance to (i.e., SMS or results list), the text to display, the text to be used for TTS, any advertising text to be displayed, an SMS trailer to append to the SMS message, etc.

Usage Process—TTS: The user may choose to have the results read back via Text to Speech. This can be an option the user could disable to save network bandwidth, but adds value when in a situation where looking at the screen is not desirable, like when driving. If TTS is used, the TTS string is extracted from the results and sent via an HTTP request to the TTS servlet. Exemplary protocol details for such a request can be seen in FIG. 20. The request blocks until the TTS is generated and returns audio in the format supported by the phone in the body of the result. This is performed in a separate thread on the device since the transaction may take some time to complete. The resulting audio is then played to the user through the AudioService object on the client. Preferably, TTS speech from the server is encrypted using Corrected Block Tiny Encryption Algorithm (XXTEA) encryption.

Usage Process—Correct: As a means of tracking accuracy and improving future SMS based language models, if the user makes a correction to transcribed text on the phone via the key elements of the key input unit 74 before sending the message, the corrected text is submitted to the Correct servlet along with the receipt for the request. This information is stored on the server for later use in analyzing accuracy and compiling a database of typical SMS messages. Exemplary protocol details for such a submission can be seen in FIG. 21.

Usage Process—Ping: Typically, web sessions will timeout after a certain amount of inactivity. The Ping servlet can be used to send a quick message from the client to keep the session alive. Exemplary protocol details for such a message can be seen in FIG. 22.

Usage Process—Debug: Used mainly for development purposes, the Debug servlet sends logging messages from the client to a debug log on the server. Exemplary protocol details can be seen in FIG. 23.

Usage Process—Logout: To logout from the Yap server, an HTTP logout request needs to be issued to the server. An exemplary such request would take the form: "/Yap/Logout: jsessionid=1234", where 1234 is the session ID.

User Preferences: In at least one embodiment, the Yap website has a section where the user can log in and customize their Yap client preferences. This allows them to choose from available Yaplets and assign them to Yap9 keys on their phone. The user preferences are stored and maintained on the server and accessible from the Yap web application. This frees the Yap client from having to know about all of the different back-end Yaplets. It just records the audio, submits it to the server along with the Yap9 key and Yap9 screen used for the recording and waits for the results. The server handles all of the details of what the user actually wants to have happen with the audio.

The client needs to know what type of format to utilize when presenting the results to the user. This is accomplished through a code in the Results object. The majority of requests fall into one of two categories: sending an SMS message, or displaying the results of a web services query in a list format. Notably, although these two are the most common, the Yap architecture supports the addition of new formats.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A computer-implemented method comprising:
receiving, at a user device, data representing text, the text comprising final speech transcription results and intermediate speech transcription results generated from an audio stream comprising an utterance;
at least temporarily displaying, via the user device, all of the intermediate speech transcription results in a list, wherein each newly-received intermediate transcription result is added to the list as it is received at the user device; and
displaying, via the user device, the final speech transcription results for viewing by a user.

2. A computer-implemented method comprising:
  receiving, at a user device, data representing text, the text comprising final speech transcription results and intermediate speech transcription results generated from an audio stream comprising an utterance;
  at least temporarily displaying the intermediate speech transcription results via the user device; and
  displaying the final speech transcription results via the user device;
  wherein the intermediate speech transcription results are displayed via the user device substantially while the final speech transcription results are displayed.

3. The computer-implemented method of claim 2, wherein displaying the intermediate speech transcription results further comprises displaying fragments of the intermediate speech transcription results in association with corresponding fragments of the final speech transcription results.

4. The computer-implemented method of claim 3, wherein displaying the intermediate speech transcription results further comprises displaying one or more intermediate speech transcription results associated with a fragment in the final speech transcription results.

5. The computer-implemented method of claim 3, wherein displaying the intermediate speech transcription results further comprises displaying one or more intermediate speech transcription results only for a particular fragment in the final speech transcription results.

6. The computer-implemented method of claim 5, further comprising receiving user input representative of the particular fragment in the final speech transcription results for which associated intermediate speech transcription results are to be displayed.

7. The computer-implemented method of claim 3, wherein displaying the intermediate speech transcription results further comprises displaying one or more intermediate speech transcription results associated with a fragment in the final speech transcription results via a dropdown list.

8. The computer-implemented method of claim 7, wherein the dropdown list is ordered according to a confidence level associated with each of the respective intermediate speech transcription results.

9. The computer-implemented method of claim 3, wherein displaying the intermediate speech transcription results further comprises displaying one or more intermediate speech transcription results for each fragment in the final speech transcription results.

10. A non-transitory computer-readable medium comprising a computer-executable component configured to be executed in one or more processors of a user device, the computer-executable component being further configured to:
  receive speech via the user device;
  obtain one or more intermediate speech transcription results from the speech;
  cause the user device to display each of the one or more intermediate speech transcription results as it is obtained;
  obtain final transcription results from the speech; and
  upon obtaining the final transcription results from the speech, cause the user device to display concurrently both the one or more intermediate transcription results and the final transcription results.

11. The non-transitory computer-readable medium of claim 10, wherein the computer-executable component is further configured to obtain the one or more intermediate speech transcription results from the speech by generating the one or more intermediate speech transcription results from the speech.

12. The non-transitory computer-readable medium of claim 10, wherein the computer-executable component is further configured to obtain the final transcription results from the speech by generating the final transcription results from the speech.

13. The non-transitory computer-readable medium of claim 10, wherein the computer-executable component is further configured to:
  for a fragment of the final transcription results, cause the user device to display a list of the fragment's corresponding intermediate speech transcription results.

14. The non-transitory computer-readable medium of claim 13, wherein the computer-executable component is further configured to receive, via the user device, a selection of an intermediate speech transcription result in the list.

15. The non-transitory computer-readable medium of claim 13, wherein:
  the corresponding intermediate speech transcription results each have a confidence value; and
  the corresponding intermediate speech transcription results are ordered in the list according to their confidence values.

16. A system comprising:
  an electronic data store configured to store instructions, that when executed, implement an automatic speech recognition engine; and
  a computing device in communication with the electronic data store, the computing device configured to:
  receive speech;
  obtain, using the automatic speech recognition engine, one or more intermediate speech transcription results from the speech;
  display each of the one or more intermediate speech transcription results as it is obtained;
  obtain, using the automatic speech recognition engine, final transcription results from the speech; and
  upon obtaining the final transcription results from the speech, display concurrently both the one or more intermediate transcription results and the final transcription results.

17. The system of claim 16, wherein the computing device is further configured to obtain the one or more intermediate speech transcription results from the speech by generating the one or more intermediate speech transcription results from the speech.

18. The system of claim 16, wherein the computing device is further configured to obtain the final transcription results from the speech by generating the final transcription results from the speech.

19. The system of claim 16, wherein the computing device is further configured to:
  for a fragment of the final transcription results, display a list of the fragment's corresponding intermediate speech transcription results.

20. The system of claim 19, wherein the computing device is further configured to receive a selection of an intermediate speech transcription result in the list.

21. The system of claim 19, wherein:
  the corresponding intermediate speech transcription results each have a confidence value; and
  the corresponding intermediate speech transcription results are ordered in the list according to their confidence values.

* * * * *